United States Patent [19]
Kozuka

[11] Patent Number: 6,166,727
[45] Date of Patent: Dec. 26, 2000

[54] VIRTUAL THREE DIMENSIONAL SPACE SHARING SYSTEM FOR A WIDE-AREA NETWORK ENVIRONMENT

[75] Inventor: Hiroshi Kozuka, Tokyo, Japan

[73] Assignee: Mitsubishi Denki Kabushiki Kaisha, Tokyo, Japan

[21] Appl. No.: 09/124,035

[22] Filed: Jul. 29, 1998

[30]  Foreign Application Priority Data

Dec. 15, 1997 [JP] Japan ..................................... 9-344859

[51] Int. Cl.[7] .................................................. G06F 15/00
[52] U.S. Cl. .......................... 345/302; 345/329; 709/235
[58] Field of Search .................................... 345/305, 329, 345/330–332; 709/246, 247, 232, 234, 235; 707/10

[56]  References Cited

U.S. PATENT DOCUMENTS

| | | | |
|---|---|---|---|
| 4,479,195 | 10/1984 | Herr et al. ................................ | 709/204 |
| 4,540,850 | 9/1985 | Herr et al. ............................... | 379/88.1 |
| 4,640,989 | 2/1987 | Riner et al. ............................. | 379/93.1 |
| 4,714,989 | 12/1987 | Billings ...................................... | 707/10 |
| 4,734,934 | 3/1988 | Boggs et al. ............................ | 379/202 |
| 5,021,976 | 6/1991 | Wexelblat et al. ...................... | 345/356 |
| 5,633,859 | 5/1997 | Jain et al. ................................ | 370/234 |
| 5,659,691 | 8/1997 | Durward et al. ........................ | 345/978 |
| 5,802,040 | 9/1998 | Park et al. ............................... | 370/232 |
| 5,901,138 | 5/1999 | Bader et al. ............................. | 370/229 |
| 5,903,547 | 5/1999 | Shimokasa ............................... | 370/232 |
| 5,912,877 | 6/1999 | Shirai et al. ............................. | 370/228 |
| 5,912,894 | 6/1999 | Duault et al. ............................ | 370/433 |

FOREIGN PATENT DOCUMENTS

| | | |
|---|---|---|
| 0797338 | 9/1997 | European Pat. Off. . |
| 7-288791 | 10/1995 | Japan . |

OTHER PUBLICATIONS

Bennett, Roy, et al., "Networked Multimedia and Document Systems", Research Report of the Dept. of Computer Science, University College London, 1997. 23 pages. <http://www.cs.ucl.ac.uk/research/resrep96/MM2REV4.htm>.

J. Mark Pullen et al., "Networking Technology and DIS," Proceedings of the IEEE, vol. 83, No. 8, Aug. 1995, pp. 1156–1167.

J. Mark Pullen, "Networking for Distributed Virtual Simulation," Computer Networks and ISDN Systems 27 (1994) pp. 387–394.

Ronald C. Hofer et al., "DIS Today," Proceedings of the IEEE, vol. 83, No. 8, Aug. 1995, pp. 1124–1136.

*Primary Examiner*—Joseph H. Feild

[57]  ABSTRACT

The present invention makes it possible for a user to share a virtual three dimensional space consisting of a plurality of media in a large wide-area network which includes a wide-band/high-speed network and narrow-band/low-speed network, without causing congestion in the network. The present invention include a multicast message transmitting unit and multicast message receiving unit for performing multicast communication in the wide-band/high-speed network, a unicast message transmitting unit and unicast message receiving unit for performing unicast communication in the narrow-band/low-speed network. A multicast group managing unit, multicast message generating unit and unicast message generating unit coordinate the unicast communication and the multicast communication. A message thinning/re-assembling unit reduces the communication traffic in the narrow-band/low-speed network, and the wide-band/high-speed network and the low-band/low-speed network are provided with respective terminals for sharing a three dimensional virtual environment.

18 Claims, 20 Drawing Sheets

VIRTUAL THREE DIMENSIONAL SPACE SHARING SYSTEM FOR A WIDE-AREA NETWORK ENVIRONMENT

BACKGROUND OF THE INVENTION

1. Field of the Invention

The present invention relates to a virtual three dimensional space sharing system in which a plurality of users geographically separated can communicate with each other, in a virtual three dimensional space created on a computer network, using a plurality of information media such as three dimensional or two dimensional computer graphics, real-time video, live sound, voice and pre-recorded sound, in a large wide-area network that co-exists with the wide-band/high-speed networks and narrow-band/low-speed networks.

2. Description of the Prior Art

FIG. 19 illustrates an example of a conventional virtual three dimensional space sharing device which is disclosed, for example, in the Japanese laid-open publication 7-288791. For the sake of simplicity, FIG. 19 illustrates a case where one virtual space sharing device accommodates three terminals.

FIG. 19 illustrates a virtual space sharing device 2010. The virtual space sharing device 2010 includes line interface units 2011, 2012 and 2013, a position information distributing unit 2014, a distance calculating unit 2015, a visual axis matching calculating unit 2016, and a video thinning rate determining unit 2017, and an inter-video thinning/distributing unit 2018.

The virtual space sharing device 2010 further includes video receiving internal buses 2019, 2023 and 2027, video transmitting internal buses 2020, 2024 and 2028, position information transmitting internal buses 2022, 2026 and 2030, a distance calculation result transferring internal bus 2031, a video thinning rate notifying internal bus 2033 and communication lines 2034, 2035 and 2036 (INS64).

The operation of this device is explained below. The virtual space sharing device 2010 transmits/receives the video and position information via INS64 lines 2034, 2035 and 2036 to/from the terminals. Initially, the data from the lines 2034, 2035 and 2036 are received in the line interface units 2011, 2012 and 2013.

The line interface units 2011, 2012 and 2013 analyze the received data. If the data are video, the video is transferred to the inter-video thinning/distributing unit 2018 via internal buses 2019, 2023 and 2027, and also to the distance calculating unit 2015 and the visual axis matching calculating unit 2016 via internal buses 2021, 2025 and 2029.

The position information distributing unit 2014 copies the position information which is received from the internal bus 2021, and transfers the copy to the line interface units 2012 and 2013 via the internal buses 2026 and 2030. The position information distributing unit 2014 also copies the position information which is received from the internal bus 2025, and transfers the copy to the line interface units 2011 and 2013 via internal buses 2022 and 2030.

Furthermore, the position information distributing unit 2014 copies the position information which is received from the internal bus 2029, and transfers the copy to the line interface units 2011 and 2012 via the internal buses 2022 and 2026.

The distance calculating unit 2015 calculates the mutual distance d from the position information received from the internal buses 2021, 2025 and 2029. By comparing the calculated distance d with the depth L of a virtual space, if $0<d\leq L/4$, the value 4 is given and transferred to the video thinning rate determining unit 2017 via internal bus 2031. If $L/4<d\leq L/2$, a value 2 is given, if $L/2<d\leq 3L/4$, a value 2 is given, and if $3L/4\leq d\leq L$, a value 1 is given, and these values are transferred to the video thinning rate determining unit 2017 via internal bus 2031.

The visual axis matching calculating unit 2016 calculates the cross angle θ between the visual axes of the users according to the position information received via internal buses 2021, 2025 and 2029. If the visual field of one user overlaps with that of another at a particular terminal, the user is assigned with a value 3, and the value 3 is transferred to the video thinning rate determining unit 2017. If the visual field does not overlap and $0<\theta\leq 45°$, a value 2 is assigned, if $45°<\theta\leq 90°$, a value 1 is assigned, and if $90°<\theta\leq 180°$, a value 0 is assigned, and these values are transferred to the video thinning rate determining unit 2017.

The video thinning rate determining unit 2017 calculates a product of d and θ for each user. Based on the calculated product, the transmission bit rate distribution to the respective user's terminal is determined by proportional distribution so that their total amount is 64 kbit/second. The determined transmission bit rate distributions is transferred to the video thinning/distributing unit 2018 via internal bus 2033.

The video thinning/distributing unit 2018 thins the video received from the internal buses 2023 and 2027, and transmits the result to the internal bus 2020 based on the transmission bit rate distribution received from the video thinning rate determining unit 2017 via internal bus 2033. The video thinning/distributing unit 2018 does the same for the video received from 2019 and 2027, and transmits the result to the internal bus 2024, and does the same for the video received form the internal buses 2019 and 2023, and transmits the result to the internal bus 2028.

The thinning process operates so as to reduce the frame numbers per second, or to reduce the resolution, or to reduce both. The line interface units 2011, 2012 and 2013 transmit the videos received from the internal busses 2020, 2024 and 2028 to the lines 2034, 2035 and 2036, respectively.

The network connection in this virtual three dimensional space sharing device is a star type connection, which is illustrated in FIG. 20. The arrangement of FIG. 20 includes terminals 2101, a video server 2103, a public network 2104 and lines 2105. The respective terminals 2101 and the video server 2103 are all connected to the public network (INS64) via the lines 2105, and the information of a virtual three dimensional space is transmitted from the video server 2103 to the respective terminals 2101. In this context, the virtual space sharing device 2010 of FIG. 19 corresponds to the video server 2103 of FIG. 20.

As explained above, a star type connection in the user environment is a prerequisite for the conventional virtual three dimensional space sharing system. Thus, in a complex network environment where wide-band/high-speed network and low-speed narrow-band network co-exist, it has been very difficult to provide efficient services to both terminal devices connected to the wide-band/high-speed network and the narrow-band/low-speed network at the same time.

In addition, because the rendering functions which are used in the respective terminal devices are not taken into account, the information is uniformly transmitted to all of the users, even when there exists significant differences of the frame rates, number of colors and resolution between the respective terminals.

Moreover, the conventional device could not efficiently use the network bandwidth when varieties of media other than video such as computer graphics, live sound, voice and pre-recorded sound are provided.

Furthermore, the users could not control the quality of information regarding a virtual three dimensional space, even when the quality deterioration is caused by the limitations of communication bandwidth.

Still further, because the conventional device only relates the information transmission from the video server side to the user terminal device side, there is no way to prevent the congestion which might occur in the network when the number of messages increases to change the objects in the virtual space in response to the user terminal devices.

SUMMARY OF THE INVENTION

It is an object of the present invention to provide a virtual three dimensional space sharing system wherein the user terminal devices connected to the wide-band/high-speed network effectively share high-quality virtual three dimensional space and perform multicast communication therebetween, taking advantage of the wide bandwidth and high-speed, and at the same time, the user terminal devices connected to the narrow-band/low-speed network share a reasonable quality virtual three dimensional space and perform unicast communication therebetween, according to the bandwidth and speed of the network.

It is another object of the present invention to provide a virtual three dimensional space sharing system which is able to reduce the number of the sound message, and to avoid congestion of the narrow-band/low-speed network.

It is a further object of the present invention to provide a virtual three dimensional space sharing system which is able to reduce necessary communication messages and to avoid the congestion of the narrow-band/low-speed network without deteriorating the information quality.

It is a still further object of the present invention to provide a virtual three dimensional space sharing system in which it is possible to automatically adjust the message communication, and to provide an effective virtual three dimensional space sharing device.

It is a further object of the present invention to provide a virtual three dimensional space sharing system in which it is no longer necessary to perform message reduction each time, and in which is possible to improve the overall processing speed and to reduce the number of voice messages at the same time.

It is a further object of the present invention to provide a virtual three dimensional space sharing system in which it is possible to obtain information regarding the virtual three dimensional space closer to information that the user desired.

It is a further object of the present invention to provide a virtual three dimensional space sharing system in which it is possible to reduce the size of the messages corresponding to a background sound which is the same for the second time and thereafter, and to reduce the network communication traffic.

It is a further object of the present invention to provide a virtual three dimensional space sharing system in which it is possible not to transmit the messages relating to the slight movement of the objects, which other users would hardly notice, in order to reduce undesired network communication traffic.

According to an aspect of the invention, a virtual three dimensional space sharing system operating in a wide-area network environment having both a wide-band/high-speed network provided with user terminal devices and a narrow-band/low-speed network provided with user terminal devices, for sharing a virtual three dimensional space comprised of a plurality of media among the user terminal devices includes, (a) a multicast message transmitting unit and a multicast message receiving unit for performing multicast communication with the wide-band/high-speed network; (b) a unicast message transmitting unit and a unicast message receiving unit for performing unicast communication with the narrow-band/low-speed network; (c) a multicast group managing unit, a unicast message generating unit and a multicast message generating unit, for coordinating the multicast communication and the unicast communication; and (d) a message thinning/re-assembling unit for reducing the communication traffic in the narrow-band/low-speed network.

According to another aspect of the invention, in the virtual three dimensional space sharing system, the message thinning/re-assembling unit mixes and compresses a plurality of sound messages which are transmitted from the user terminal devices into one message.

According to a further aspect of the invention, in the virtual three dimensional space sharing device, the message thinning/re-assembling unit reduces and re-assembles the messages based on the visual field range and visual field angle parameter of the video object placed in the virtual three dimensional space, based on a communication load measurement.

According to a still further aspect of the invention, in the virtual three dimensional space sharing system, each user terminal device connected to the narrow-band/low-speed network includes a communication delay measuring unit for measuring a delay time to/from the virtual three dimensional space sharing device, the communication delay measuring unit sets and changes an auditory parameter defined by the visual field and visual field angle parameter toward the video object placed in the virtual three dimensional space or distance from the sound object, based on a communication load measurement.

According to a further aspect of the invention, in the virtual three dimensional space sharing device, the message thinning/re-assembling unit includes a background sound managing unit for managing the recorded background for each direction, the background sound managing unit calculates the direction of the background sound based on the position and the sound volume of a sound object, and transfers the corresponding background sound to the terminal devices.

According to a further aspect of the invention, the virtual three dimensional space sharing system further includes a message distribution determining unit for controlling the sense balance of the auditory sense and visual sense of the sound objects and the video objects, which includes the updated virtual space on the user terminal devices, and the message distribution determining unit distributes the messages received from the user terminal devices to the sound objects and the video objects based on the sense parameters.

According to a further aspect of the invention, in the virtual three dimensional space sharing system, the message thinning/re-assembling unit includes a transmitted data managing unit for managing the background sounds which have been already transmitted, the message thinning/re-assembling unit transmits only identifiers, stored in the transmitted data managing unit, corresponding to the background sounds to the same user terminal, if the background sounds have been already transmitted; the user terminals include a received data managing unit for storing the received background sounds, and the message thinning/re-assembling unit takes out and processes the corresponding background data from the received data managing unit, if the identifier corresponding to the background sounds are received.

According to a further aspect of the invention, in the virtual three dimensional space sharing system, the user terminal devices include a virtual space information update examining unit, the virtual space information update examining unit transmits a message indicating that the state of the video object exceeds a predetermined threshold, only when the state of the video object comprising the virtual three dimensional space exceeds a predetermined threshold.

BRIEF DESCRIPTION OF THE DRAWINGS

The present invention will become more fully understood by the accompanying drawings which are given by way of illustration only, and thus are not limitative of the present invention, and wherein.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Embodiment 1.

Figure 1:
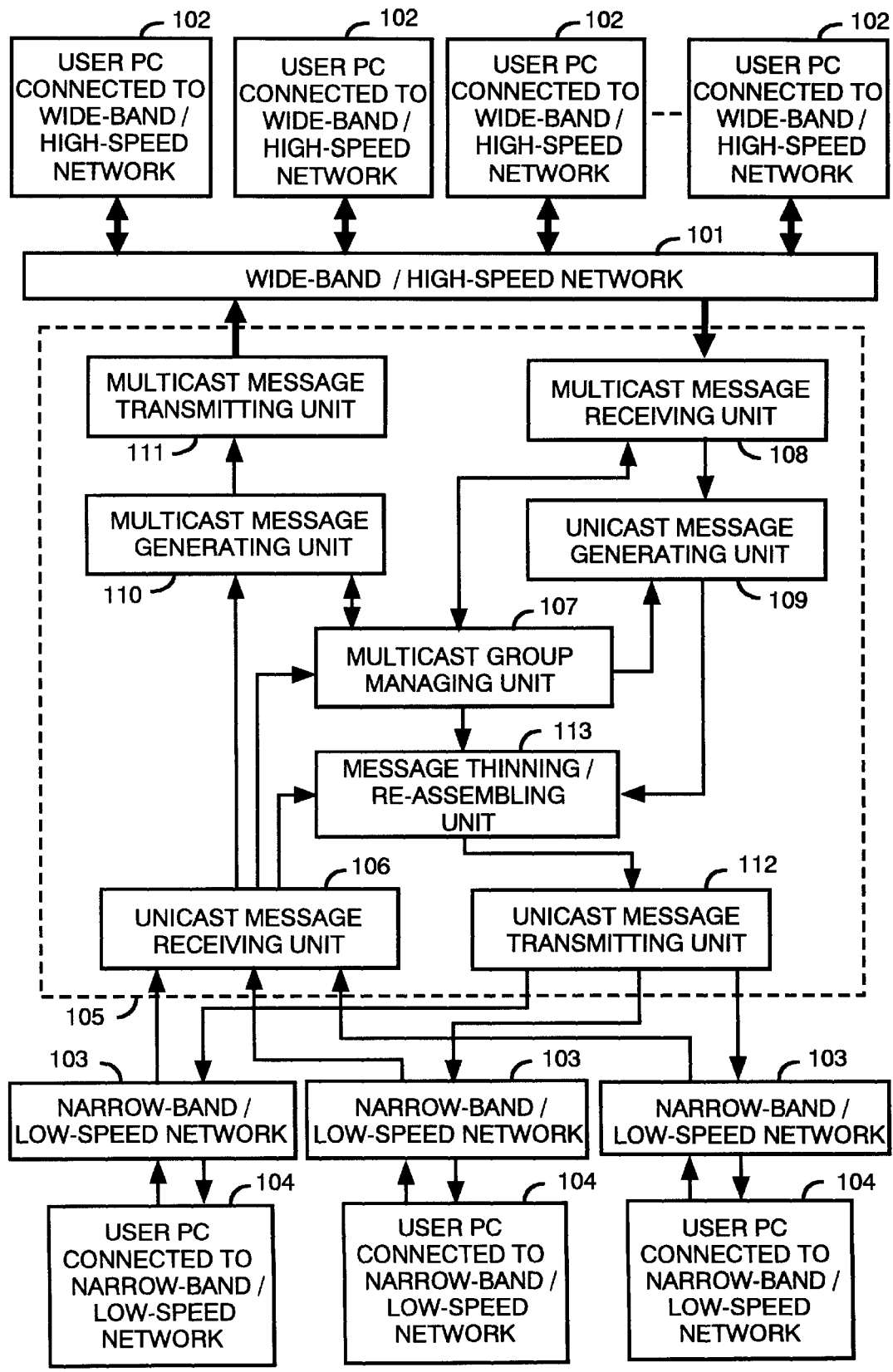
FIG. 1 illustrates a virtual three dimensional space sharing system for a large wide-area network environment according to a first embodiment of the present invention.

A first embodiment of the present invention is explained using FIGS. 1–8. FIG. 1 shows a virtual three dimensional space sharing system for a large wide-area network environment of the first embodiment. The arrangement of FIG. 1 includes a wide-band/high-speed network 101, user terminal devices 102 connected to the wide-band/high-speed network 101, a narrow-band/low-speed network 103, user terminal devices 104 connected to the narrow-band/low-speed network and a virtual three dimensional space sharing device 105 for a large wide-area network environment.

In addition, the virtual three dimensional space sharing device 105 for a large wide-area includes a unicast message generating unit 106, a multicast group managing unit 107, a multicast message receiving unit 108, a unicast message receiving unit 109, a multicast message generating unit 110, a multicast message transmitting unit 111, a unicast message transmitting unit 112, and a message thinning/re-assembling unit 113.

Figure 2:
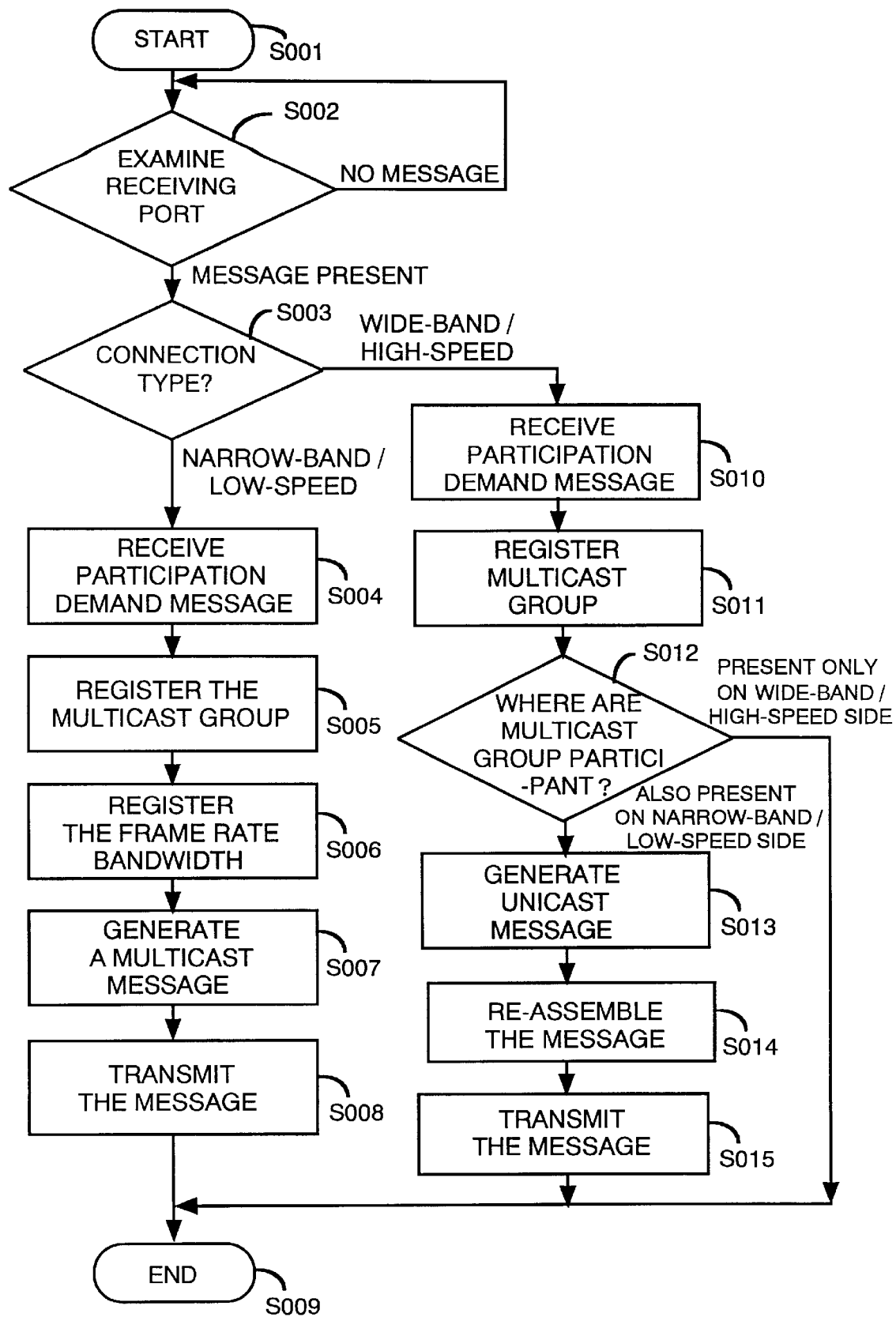
FIG. 2 is a flowchart showing the initializing operation of the virtual three dimensional space sharing system for a large wide-area network environment according to the first embodiment of the present invention.

Next, the initializing operation of the virtual three dimensional space sharing device 105 is explained below using the flowchart of FIG. 2. First, the device starts processing at a step S001, and waits for participation demand messages received from at least one user PC, at ports of the unicast message receiving unit 106 and the multicast message receiving unit 108 (step S002).

The participation demand message contains at least an address of the user terminal device, a name of a virtual three dimensional space to which the user is going to participate, available bandwidth of the network to which the user terminal device is connected, and information display frame rate information on the user terminal device.

Upon receiving the participation demand message, the device assigns the initializing processes, according to whether the message is received from the user terminal device 104 on the narrow-band/low-speed network 103, or from the user terminal device 102 on the wide-band/high-speed network 101 (step S003).

If the message is received from the narrow-band/low-speed network 103, the unicast message receiving unit 106 receives the participation demand message (step S004) and assigns the multicast group corresponding to the name of the three dimensional space, to which this user is going to participate, contained in the message. Then, the unicast message receiving unit 106 registers the address of the user and the corresponding multicast group with the multicast group managing unit 107 (step S005).

In the same manner, for the information display frame rate, the unicast message receiving unit 106 registers the number of colors and resolution of the user terminal device, and the bandwidth of the using network, which are contained in the participation demand message, with the message thinning/re-assembling unit 113 (step S006).

Furthermore, the multicast message generating unit 110 generates a multicast message, addressed to the above-described multicast group, from this participation demand message (step S007), and transmits the multicast message to the wide-band/high-speed network via the multicast message transmitting unit 111 (step S008). The initialization based on the participation demand message transmitted from the narrow-band/low-speed network is completed in this manner (step S009).

Alternatively, if the multicast message receiving unit 108 receives the participation demand message from the wide-band/high-speed network 101 as a multicast message (step S010). the multicast message receiving unit 108 registers the multicast group to which this message belongs with the multicast group managing unit 107 (step S011). If there is a user terminal device (104) on the narrow-band/low-speed network 103 side (step S012), the unicast message receiving unit 109 generates unicast messages from this message for every address of the terminal devices belonging to the multicast group, and delivers the generated unicast messages to the message thinning/re-assembling unit 113 (step S013).

The message thinning/re-assembling unit 113 re-assembles messages addressed to an identical host (user terminal device) into one message, transmits the message to the narrow-band/low-speed network 103 side via the unicast message transmitting unit 112 (step S015), and completes the initialization process (step S009).

Figure 3:
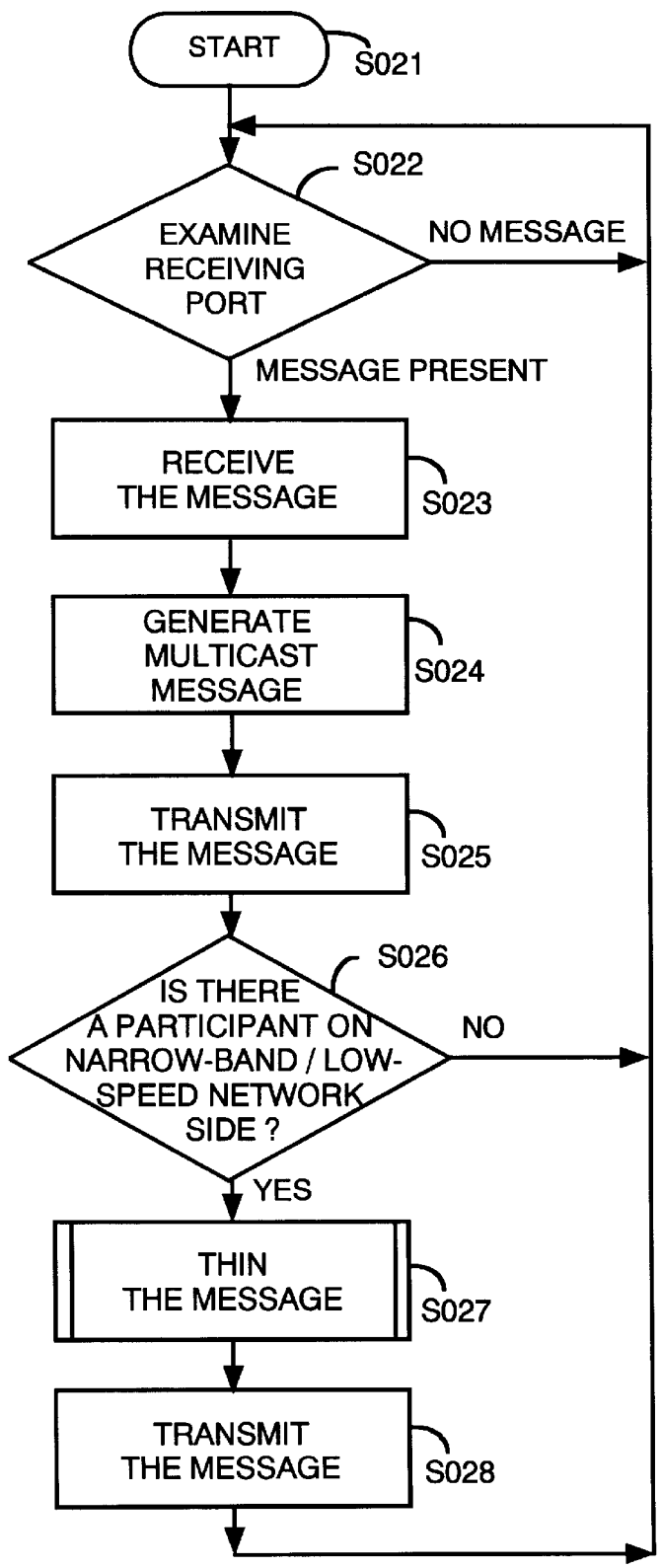
FIG. 3 is a flowchart showing processes when the virtual three dimensional space sharing device for the wide-area network environment according to the first embodiment receives a message from the narrow-band/low-speed network.

Next, processes are explained below for a case when a message is received from the narrow-band/low-speed network using the flowchart of FIG. 3 in the three dimensional space sharing state after the device initialization.

After the initialization of the virtual three dimensional space sharing device is completed, the process goes to the virtual three dimensional space sharing state (step S021). The unicast message receiving unit 106 examines the receiving port until a message arrives from a user terminal device 104 which is connected to the narrow-band/low-speed network 103 (step S022). Once a message arrives, the unicast message receiving unit 106 receives the message(step S023), and transmits the message to the multicast message generating unit 110 and the message thinning/re-assembling unit 113.

The multicast message generating unit 110 converts the received message into a multicast message which is addressed to the multicast address contained in the received message (step S024), and delivers the converted message to the multicast message transmitting unit 111. The multicast message transmitting unit 111 transmits this multicast message to the wide-band/high-speed network 101 (step S025).

The message thinning/re-assembling unit 113 queries the multicast group managing unit 107 whether there is a user terminal device 104 which is connected to the narrow-band/low-speed network, belonging to the same multicast group (step S026) as that of the received message. If there is no corresponding user terminal device 104, the message thinning/re-assembling unit 113 discards this message, and the process returns to the step S022. If there is a corresponding user terminal device 104, the message thinning/reassembling unit 113 thins the message based on the frame rate and network bandwidth, which is managed for the respective user terminals, and re-assembles it into a unicast message addressed to the respective terminal devices (step S027), and delivers this unicast message to the unicast message transmitting unit 112.

The unicast message transmitting unit 112 transmits this message to the destination user terminal device 104 via the narrow-band/low-speed network 103 using the unicast communication (step S028). Then, the processes of the above steps S022–S028 are repeated.

Figure 4:
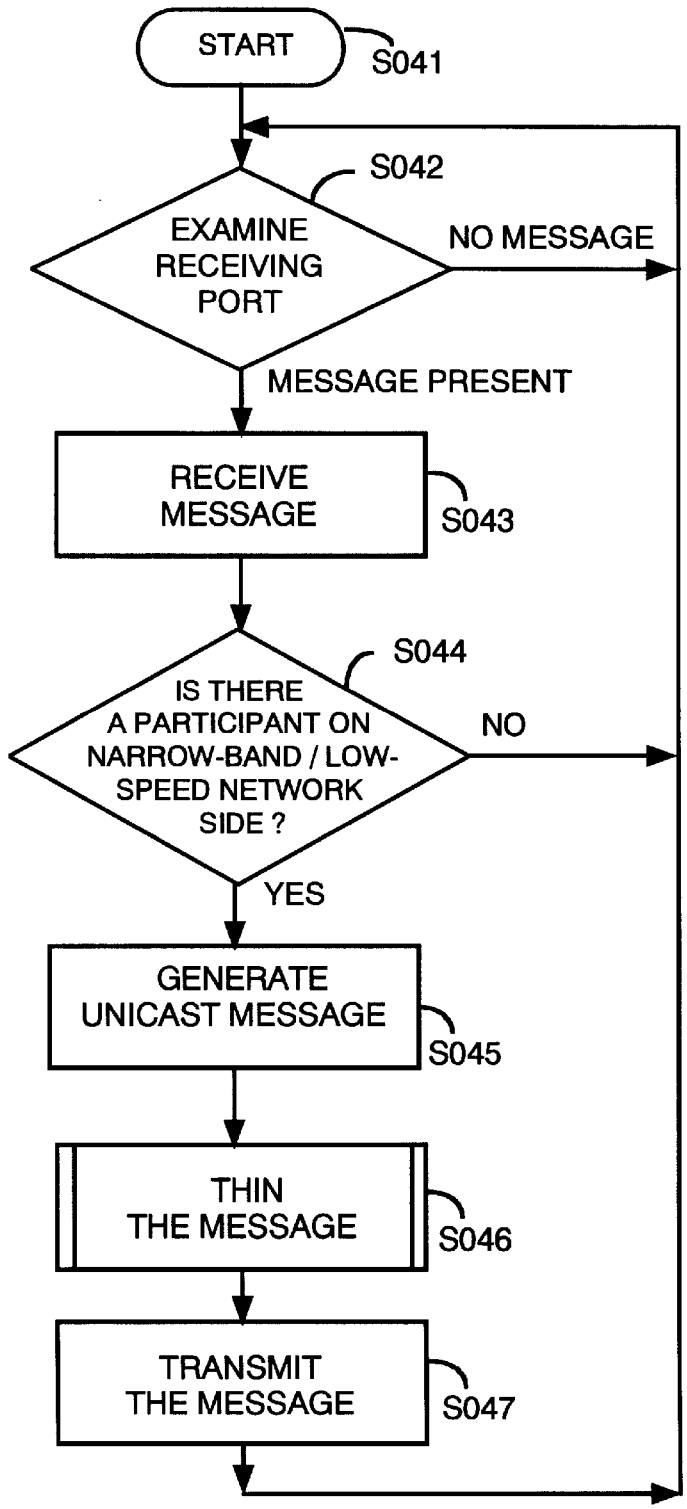
FIG. 4 is a flowchart showing processes when the virtual three dimensional space sharing device for the wide-area network environment according to the first embodiment receives a message from the wide-band/high-speed network.

Next, processes are explained below for a case when a message is received from the wide-band/high-speed network using the flowchart of FIG. 4 in the three dimensional space sharing state after the device initialization.

After the initialization of the virtual three dimensional space sharing device is completed, the device goes to the virtual three dimensional space sharing state (step S041). The multicast message receiving unit 108 examines the receiving port until a message arrives from a user terminal device 102 which is connected to the wide-band/high-speed network 101 (step S042). Once the message arrives, the multicast message receiving unit 108 receives the message (step S043), and transmits it to the unicast message receiving unit 109.

The unicast message receiving unit 109 queries the multicast group managing unit 107 whether a user terminal device, corresponding to the multicast group to which the message belongs, exists on the narrow-band/low-speed network side (step S044). If there is no corresponding user terminal, the unicast message receiving unit 109 discards this message, and the process returns to the step S042. If there is a corresponding user terminal, the unicast message receiving unit 109 generates a unicast message for each address of the respective corresponding user terminal device, and sends the unicast messages to the message thinning/re-assembling unit 113. The message thinning/re-assembling unit 113 thins the message based on the frame rate and network bandwidth, which is managed for the respective user terminals, and re-assembles it into a unicast message addressed to the respective terminal devices (step S046), and delivers this unicast message to the unicast message transmitting unit 112.

The unicast message transmitting unit 112 transmits this message to the destination user terminal device 104 via the corresponding narrow-band/low-speed network 103, using the unicast communication (step S047). Then, the processes of the above steps S042–S047 are repeated.

Figure 5:
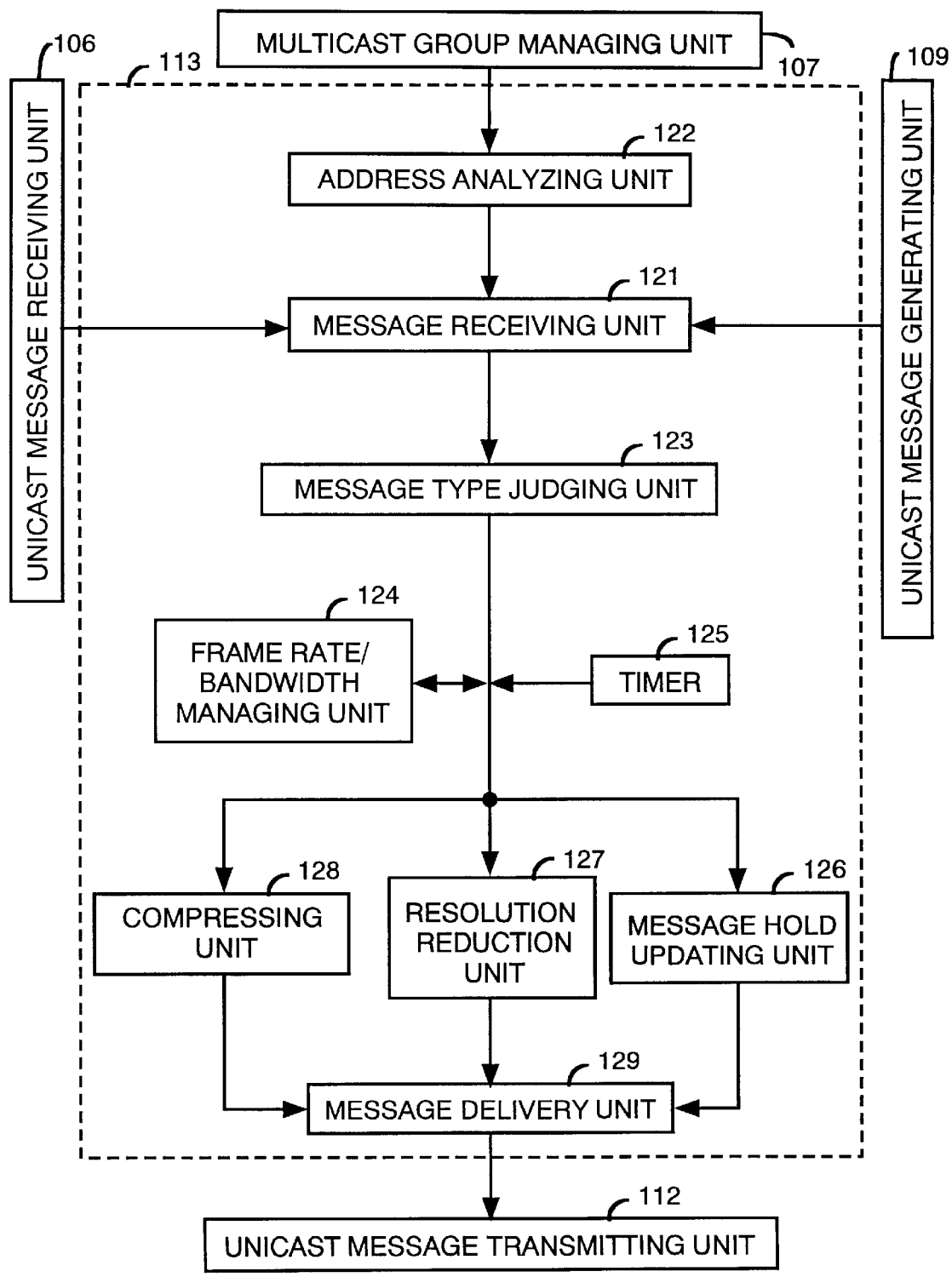
FIG. 5 illustrates a message thinning/re-assembling unit of the virtual three dimensional space sharing device for the wide-area network environment according to the first embodiment of the present invention.
Figure 6:
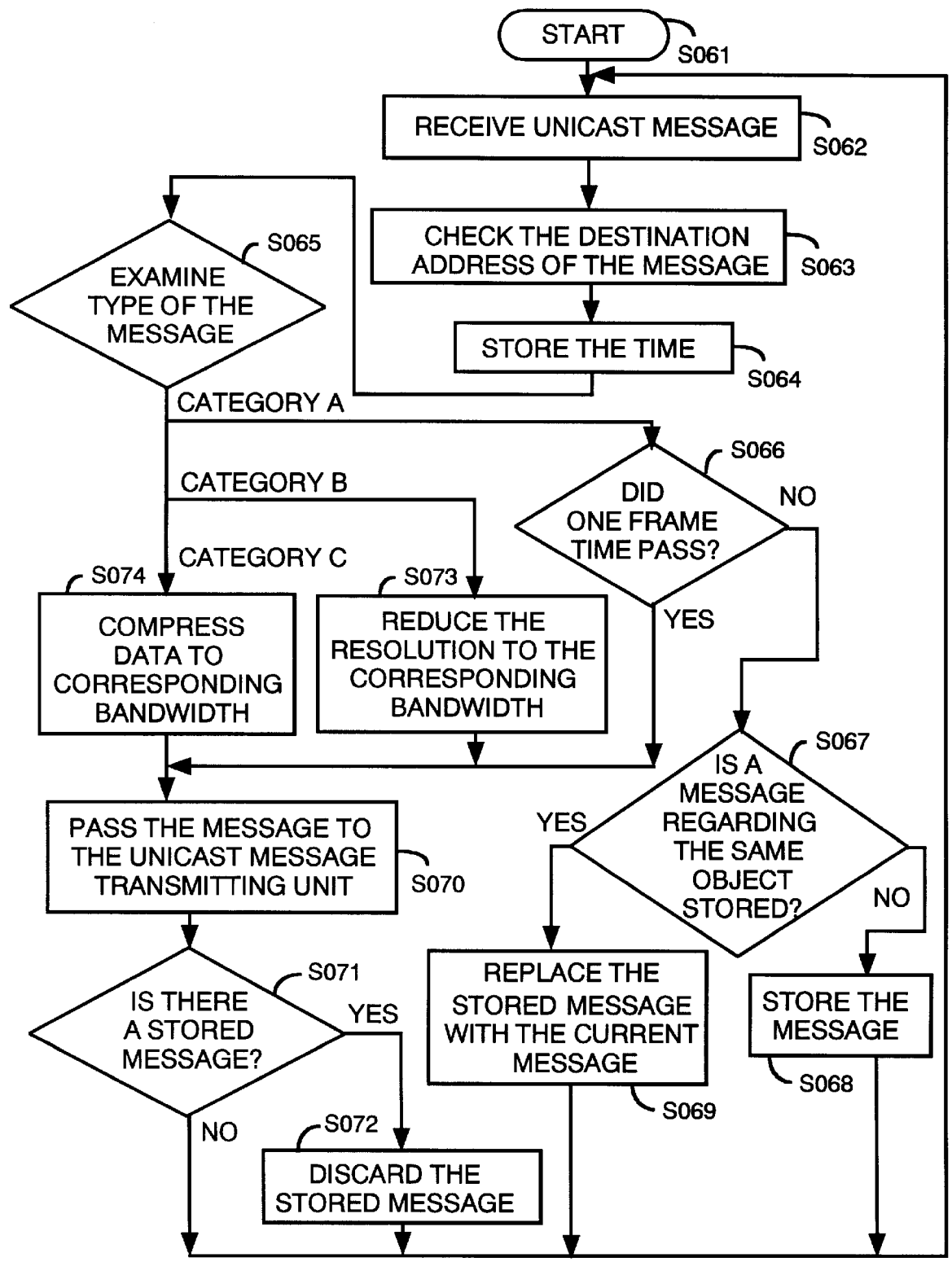
FIG. 6 is a flowchart illustrating the message thinning processes in the first embodiment of the present invention.

The message thinning/re-assembling unit 113 is explained in detail using flowcharts of FIG. 5 and FIG. 6, respectively. The arrangement of FIG. 5 includes a message receiving unit 121, an address analyzing unit 122, a message type judging unit 123, a frame rate/bandwidth managing unit 124, a timer 125, a message hold-updating unit 126, a resolution reducing unit 12, a compressing unit 128 and message delivery unit 129.

Before explaining the operation, three data categories defining the virtual three dimensional space are discussed.

(1) Category A: This category includes object data regarding avatar shape, absolute position, colors and size of the avatar of a user, or shape, absolute position, colors and size of moving shared object (s) in the virtual three dimensional space where information at a certain time is not influenced by information prior to the time.

(2) Category B: This category includes object data regarding live video, or recorded VTR video, where information is provided per frame unit;

(3) Category C: This category includes object data regarding live voice or live sound which do not make sense unless they are continuous.

In FIG. 5 and FIG. 6, once the message thinning/reassembling unit 113 starts its operation (step S061), the message receiving unit 122 receives a unicast message from either the unicast message receiving unit 106, or the unicast message generating unit 109 (step S062).

Then, the address analyzing unit 122 looks up the destination address of the received message, and carries out subsequent steps S064–S074 according to corresponding destination address.

The timer 125 records the current time (step S064), and the message type judging unit 123 examines the type of message (step S065). If the message contains data of category A, the following process A is performed, if the message contains data of category B, the following process B is performed, and if the message contains data of category C, the following process C is performed.

(1) Process A: Using the time recorded by the message hold-updating unit 126 in the step S064, and a frame rate corresponding to the terminal device which correspond to the address registered in the frame rate/bandwidth managing unit 124 at initialization, it is examined whether the time for one frame corresponding the terminal device has passed (step S066).

If the time for one frame has passed, the message delivery unit 129 delivers the message to the unicast message transmitting unit 112, and confirms if there is a stored message (step S071). If there is a stored message, the message delivery unit 129 discards the stored message (step S072) and the process returns to the step S062 so as to receive the next message.

If the time for one frame has not yet passed, the message delivery unit 129 examines whether there is any stored message regarding the same object (step S067). If no message is stored, the message delivery unit 129 stores the current message (step S068), and the process returns to the step S062 to receive the next message. If there is a stored message, the message delivery unit 129 replaces the stored message with the current message (step S069), and the process returns to the step S062 so as to receive the next message.

(2) Process B: The resolution reducing unit 127 reduces the resolution of the image so that the image is contained within the number of colors, resolution and bandwidth stored in the frame rate/bandwidth managing unit 124, re-assembles the reduced message (step S073) and delivers the reduced message to the unicast message transmitting unit 112 via the message delivery unit 129 (step S070). In the step S071, because there are not any stored messages the process returns to the step S062.

(3) Process C: The compressing unit 128 compresses the data by deteriorating the data quality, so that the images is contained within the bandwidth of image stored in the frame rate/bandwidth managing unit 124 (step S074). The compressed message is delivered to the unicast message transmitting unit 112 via the message delivery unit 129 (step S070). In the step S071, because there is no stored message, the process returns to the step S062.

When the frame rate of the user terminal device is sufficiently low compared with the frame rates of the other terminal devices, it is also possible to apply the process A for the category B data.

The user terminal device 102 connected to the wide-band high-speed network and the user terminal device 104 connected to the narrow-band/low-speed network are explained below using FIG. 7 and FIG. 8, respectively.

Figure 7:
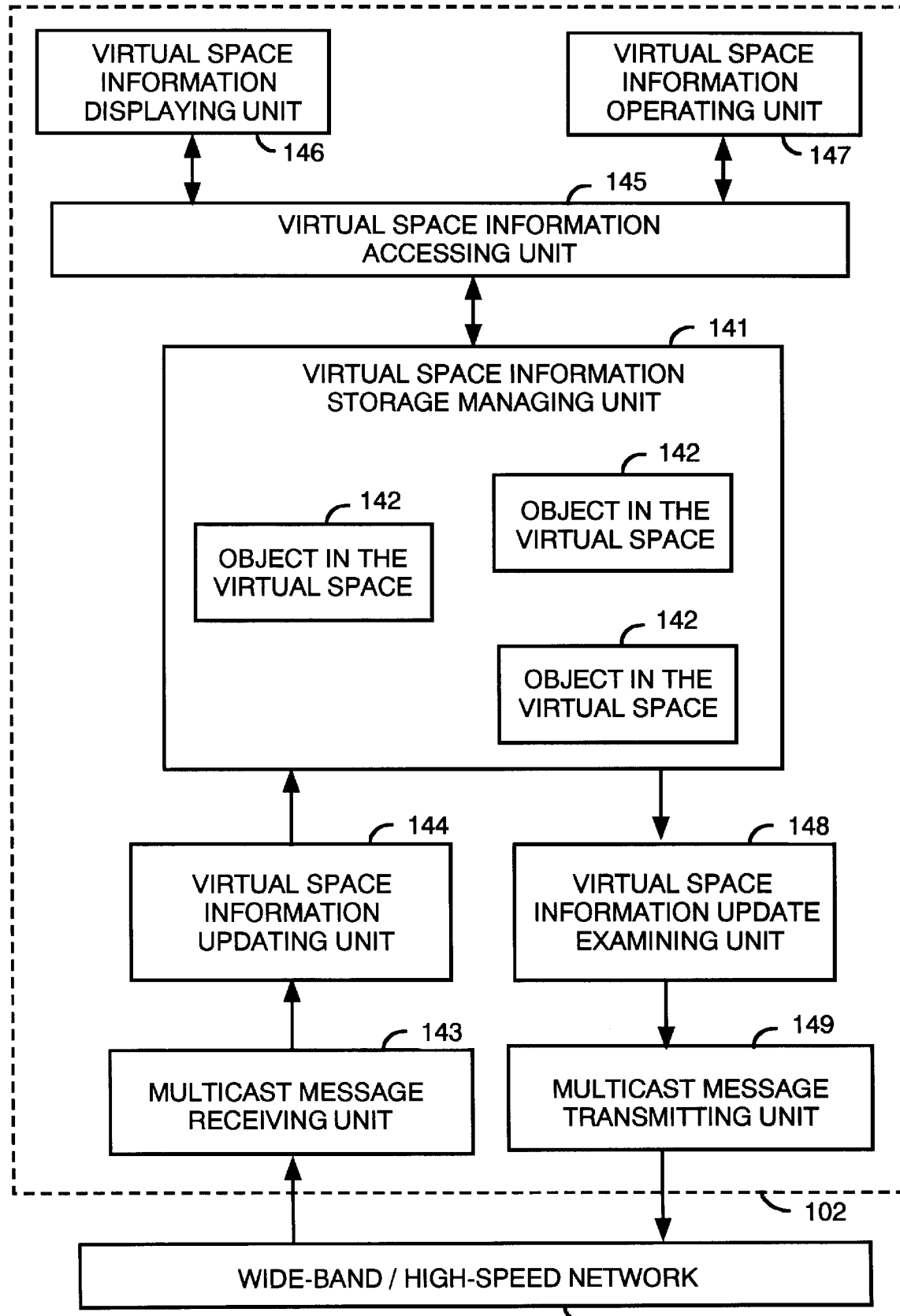
FIG. 7 illustrates a user terminal device which is connected to the wide-band/high-speed network according to the first embodiment of the present invention.

FIG. 7 illustrates the user terminal device 102 connected to the wide-band/high-speed network. The arrangement of FIG. 7 includes a virtual space information storage managing unit 141, respective objects 142 in the virtual space belonging to the above-explained category A, category B and category C, respectively, a multicast message receiving unit 143, a virtual space information updating unit 144, a virtual space information accessing unit 145, a virtual space information displaying unit 146, a virtual space information operating unit 147, a virtual space information update examining unit 148 and a multicast message transmitting unit 149.

The user terminal 102 shares a virtual three dimensional space using multicast by mutually communicating the information regarding the objects 142 in the virtual three dimensional space, between other user terminals 102 and virtual three dimensional space sharing device 105.

The multicast message receiving unit 143 receives a multicast message from the wide-band/high-speed network 101, and the virtual space information updating unit 144 registers the information regarding the objects 142 in the virtual space contained in the message into the virtual space information managing unit 141, and updates it.

The state of the three dimensional space is given to the virtual space information displaying unit 146 via the virtual space information accessing unit 145. The virtual space information displaying unit 146, then, concretely displays the information of the virtual three dimensional space to the users by rendering the virtual three dimensional space so that the human's sense organs such as visual, auditory, force and smell information can understand.

The user manipulates the objects in the virtual three dimensional space via input equipment such as a mouse, keyboard and track ball, or via a virtual space information operating unit 147 which corresponds to an application program describing the various operations on the objects. These manipulations are reflected to the virtual space objects 142 in the virtual space information storage managing unit 141 via the virtual space information accessing unit 145.

When the state of the objects 142 in the virtual space is changed by such manipulation, the virtual space information update examining unit 148 detects this change, and transmits the changed contents to the wide-band/high-speed network 101 via the multicast message transmitting unit 149. By performing the series of the operations explained above, the respective users interact with the virtual three dimensional space.

Figure 8:
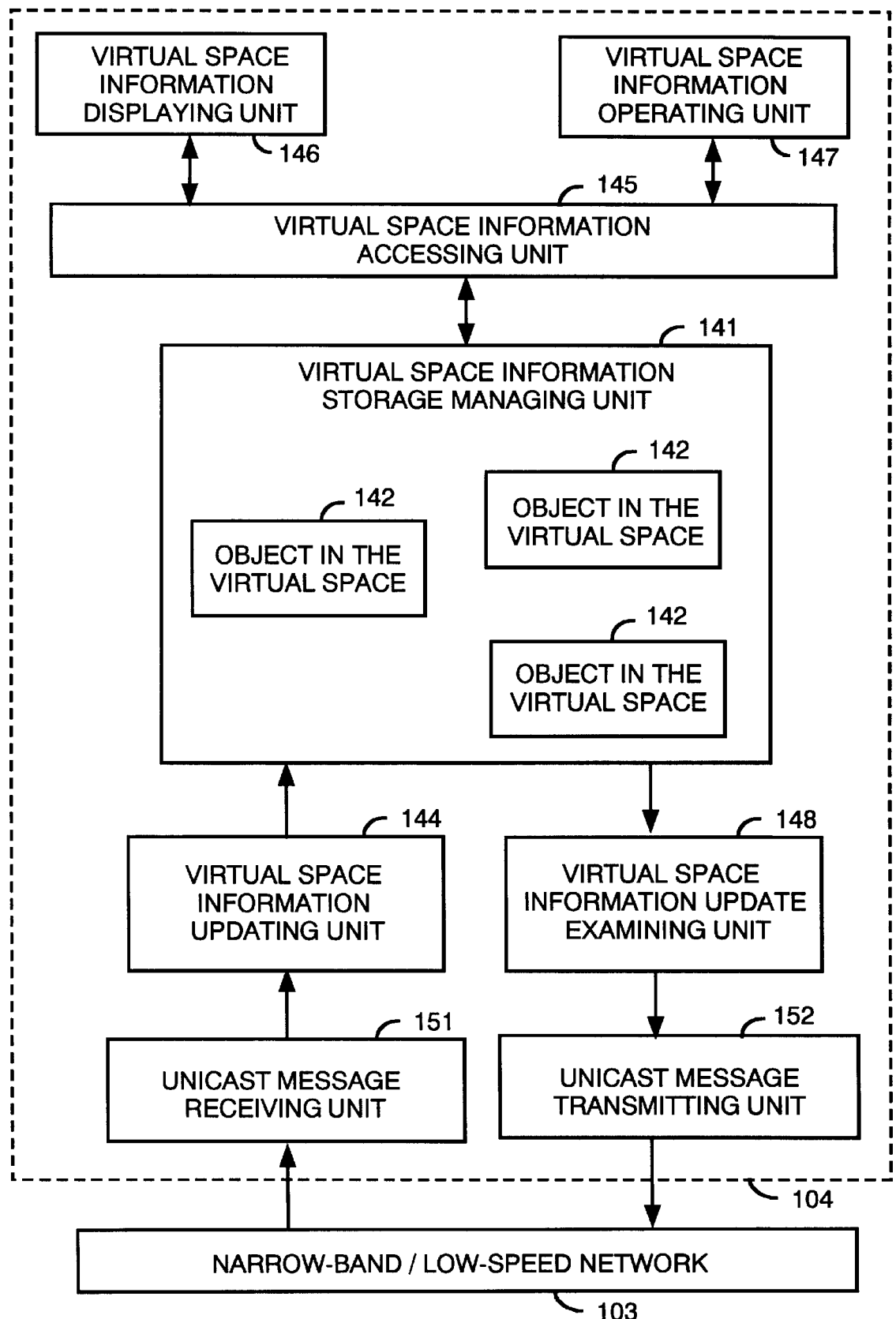
FIG. 8 illustrates a user terminal device which is connected to the narrow-band/low-speed network according to the first embodiment of the present invention.

FIG. 8 shows a user terminal device 104 connected to the narrow-band/low-speed network. The arrangement of FIG. 8 includes a unicast message receiving unit 151 and a unicast message transmitting unit 152.

The user terminal device 104 connected to the narrow-band/low-speed network 103 operates in the same manner as the user terminal device 102 connected to the wide-band/high-speed network 101. However, the user terminal device 104 is different from the user terminal device 102, in that the user terminal device 104 communicates with the three dimensional space sharing device 105 only by the unicast, using the unicast message receiving unit 151 and the unicast message transmission unit 152 via the narrow-band/low-speed network 103. According to the above operation, the virtual three dimensional space can be shared.

As explained above, in the first embodiment of the present invention, for communication which shares the virtual three dimensional space, the user devices which are connected to the wide-band/high-speed network can communicate by the multicast communication. For the user devices which are connected to the narrow-band/low-speed network, the virtual three dimensional space sharing device reduces the message according to the narrow bandwidth, and effectively reduces the message according to the frame rate, number of colors and resolution of the terminal devices. As a result, it is possible to share the virtual three dimensional space with sufficiently high quality by taking advantage of its bandwidth and the high speed, between the terminal devices connected to the wide-band/high-speed network, and at the same time for the terminal devices connected to the narrow-band/low-speed network, it is possible to share the virtual three dimensional space with the quality corresponding to the bandwidth and speed of the network.

In addition, the communication can be effectively performed for each media, even when a plurality of media other than the video are shared in the virtual three dimensional space.

By dividing the virtual space into a plurality of logical spaces and assigning the respective logical spaces to separate multicast groups, only the necessary information is communicated using the corresponding multicast groups. Therefore, the unicast communication between the virtual space sharing device connected to the narrow-band/low-speed network can be interacted with the multicast communication between the virtual space sharing device connected to the wide-band/high-speed network. Further, in an LAN environment system using communication reducing technology, it is possible to share the virtual three dimensional space by dial-up IP connection to this virtual three dimensional space sharing device using simple protocols such as SLP and PPP.

Embodiment 2.

Next, a second embodiment of the present invention is explained below using FIG. 9. In the above first embodiment, the communication traffic is reduced between the user terminal devices connected to the wide-band/high-speed network by using multicast communication, and the communication traffic is reduced between the user terminal devices connected to the narrow-band/low-speed network by thinning the messages according to the message types. The second embodiment relates to avoiding the congestion of the narrow-band/low-speed network in a situation where sound streams are received from many user terminal devices.

Figure 9:
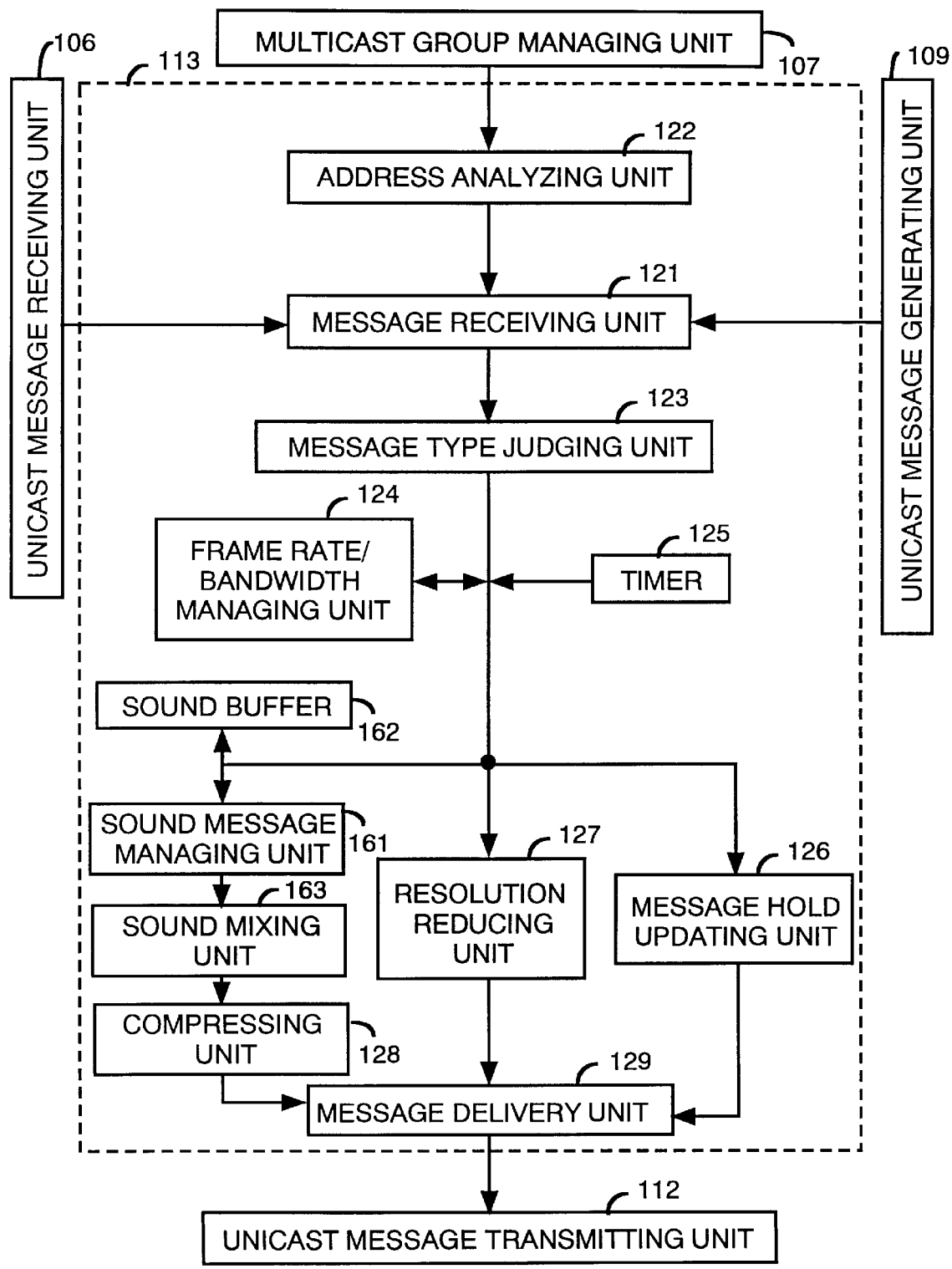
FIG. 9 illustrates a message thinning/re-assembling unit according to a second embodiment of the present invention.

FIG. 9 illustrates the arrangement of a message thinning/re-assembling unit 113 according to a second embodiment of the present invention. The arrangement of FIG. 9 includes a sound message managing unit 161, a sound buffer 162 and a sound mixing unit 163.

Next, the operation of the second embodiment of the present invention is explained below using FIG. 9. For the data of category A and category B, which are explained above for the first embodiment, the message thinning/re-assembling unit 113 operates in the same manner as that in the first embodiment.

For the data of category C, the sound message managing unit 161 temporarily stores the plurality of messages transmitted from the plurality of terminal devices to the sound buffer 162 for the same frame time. Then, the sound mixing unit 163 mixes and synthesizes the sound data contained in a plurality of messages for each frame into one sound data. The compressing unit 128 compresses this data to generate a new compressed unicast message. This compressed unicast message is delivered to the unicast message transmitting unit 112 via the message delivery unit 129.

As explained above, in the second embodiment of the present invention, the virtual three dimensional space sharing device mixes the sound messages transmitted from the plurality of terminal devices into one message, and this message is further compressed. Therefore, it is possible to reduce the number of the sound messages, and to avoid the congestion of the narrow-band/low-speed network.

Embodiment 3.

Next, a third embodiment of the present invention is explained below using FIG. 10 and FIG. 11. In the above embodiments, the number of messages are reduced based on the frame rate of the user terminal devices and the network bandwidth to avoid congestion of the network. In the third embodiment, congestion of the network is avoided by using the information regarding the avatars of the users.

Generally, the users who share a virtual three dimensional space put themselves in the space by their avatars displayed by three dimensional computer graphics. The information of the virtual three dimensional space are provided to all users in the manner that the user's eyes or ears would be located in a specific position. At this time, the information regarding the avatar of the user is provided at least a part of or all of that illustrated in FIG. 10.

Figure 10:
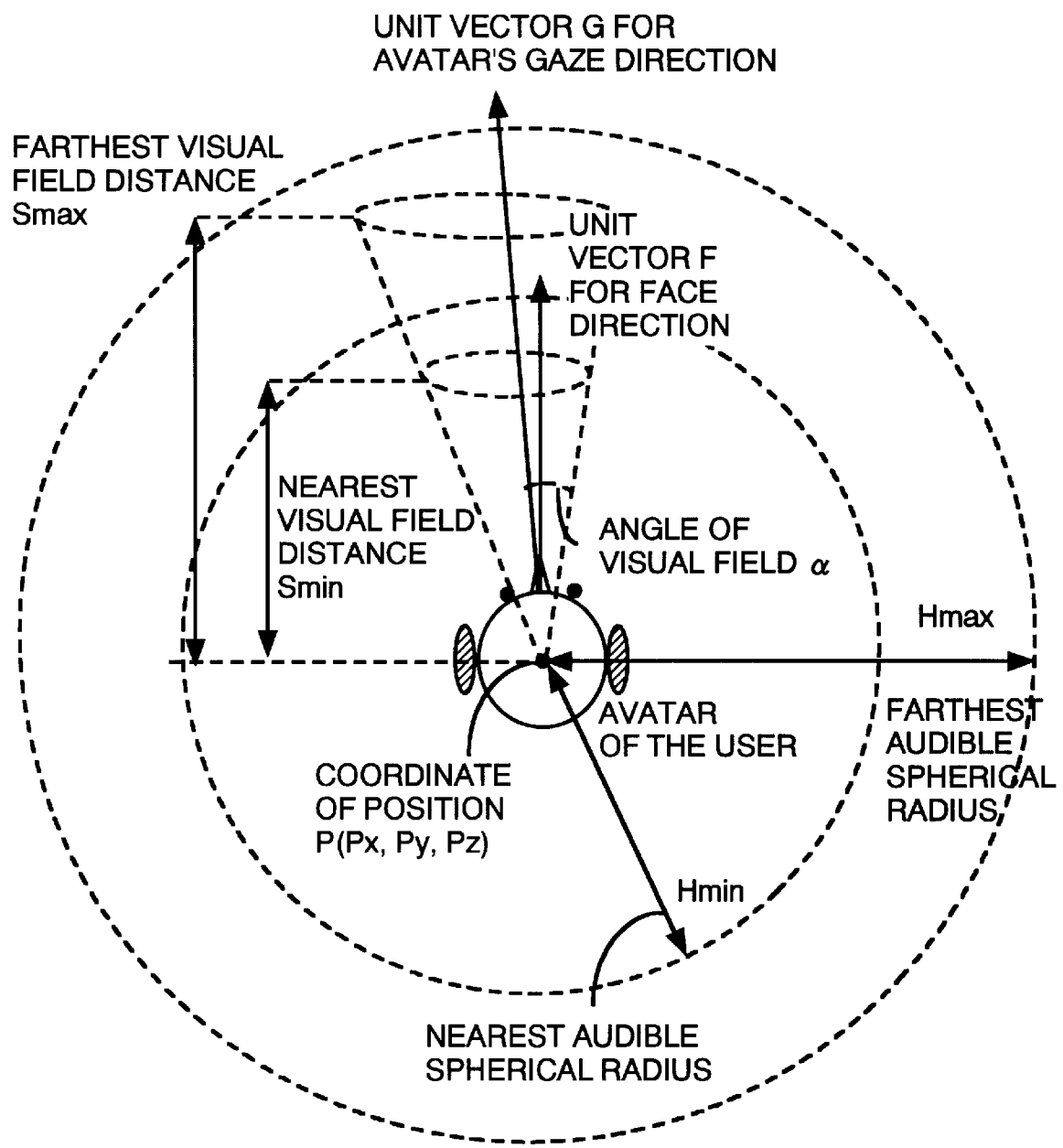
FIG. 10 explains information regarding the avatar of a user.

In FIG. 10, the position of the avatar of the user on the coordinate is indicated by P (Px, Py, Pz), the face direction of the avatar is indicated by a unit vector F, and the direction of the avatar's gaze is indicated by a unit vector G. The angle of the visual field of the avatar is indicated as $\alpha$, the nearest distance that the user can recognize an object is indicated as Smin, and the farthest distance that the user can recognize an object is indicated as Smax. The nearest spherical radius of the audible area that the user can recognize the sound source is indicated as Hmin, and the farthest spherical radius of the audible area that the user cannot recognize the sound source but can recognize the background sound is indicated as Hmax. The direction of G does not necessarily match the direction of F.

Figure 11:
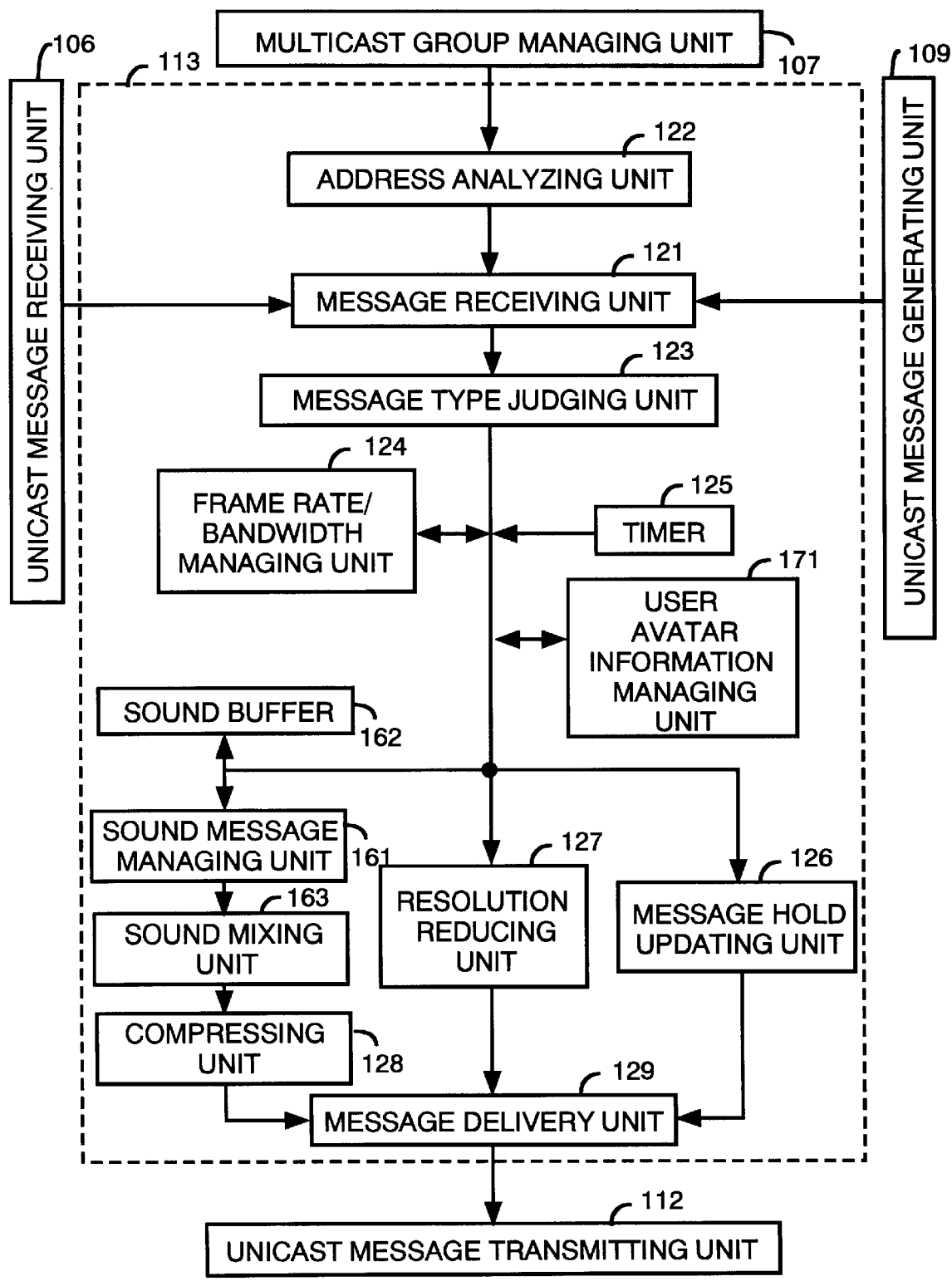
FIG. 11 illustrates a message thinning/re-assembling unit according to a third embodiment of the present invention.

In the third embodiment, the message thinning/re-assembling unit 113 is arranged in the manner shown in FIG. 11. The arrangement of FIG. 11 includes a user avatar information managing unit 171. This user avatar information managing unit collects and stores each of the above information regarding the avatar of the user through communication with the user terminal device.

Once the message receiving unit 121 receives a message either from the unicast message receiving unit 106 or from the unicast message generator 109, the address analyzing unit 122 examines the destination address of this message, and takes out the information regarding the avatar of the user corresponding to this destination address from the user avatar information managing unit 171.

The message is thinned and re-assembled for each category of the message in the same manner as in the first or second embodiment. If the message is of category A or category B, the message is processed only when the position of the object contained in this message exists within the visual field expressed by P, G and $\alpha$, at the same time within the area of Smin and Smax. If the object exists outside this area, this message is discarded.

If the message is of category C and the position of the sound source of the message exists within the area of Hmin, the respective messages are compressed, without mixing the sounds of the plurality of messages. If the sound source of the message exists between Hmin and Hmax, the sounds are mixed, and then compressed. If the sound source of the message exists outside Hmax, this message is discarded without being processed.

In the manner explained above, in the third embodiment of the present invention, unnecessary communication is avoided by communicating only the information within an appropriate distance from the position of the avatar of the user, out of the entire information regarding the virtual three dimensional space. In this way, it is possible to avoid congestion of the narrow-band/low-speed network without deteriorating the quality of the information.

Embodiment 4.

A fourth embodiment of the present invention is explained below using FIG. 12. In contrast to the third embodiment, in the fourth embodiment, the thinning and the re-assembly of the message is controlled according to the communication state between the user terminals and the virtual three dimensional space sharing device, and the load state of the virtual three dimensional space sharing device.

Figure 12:
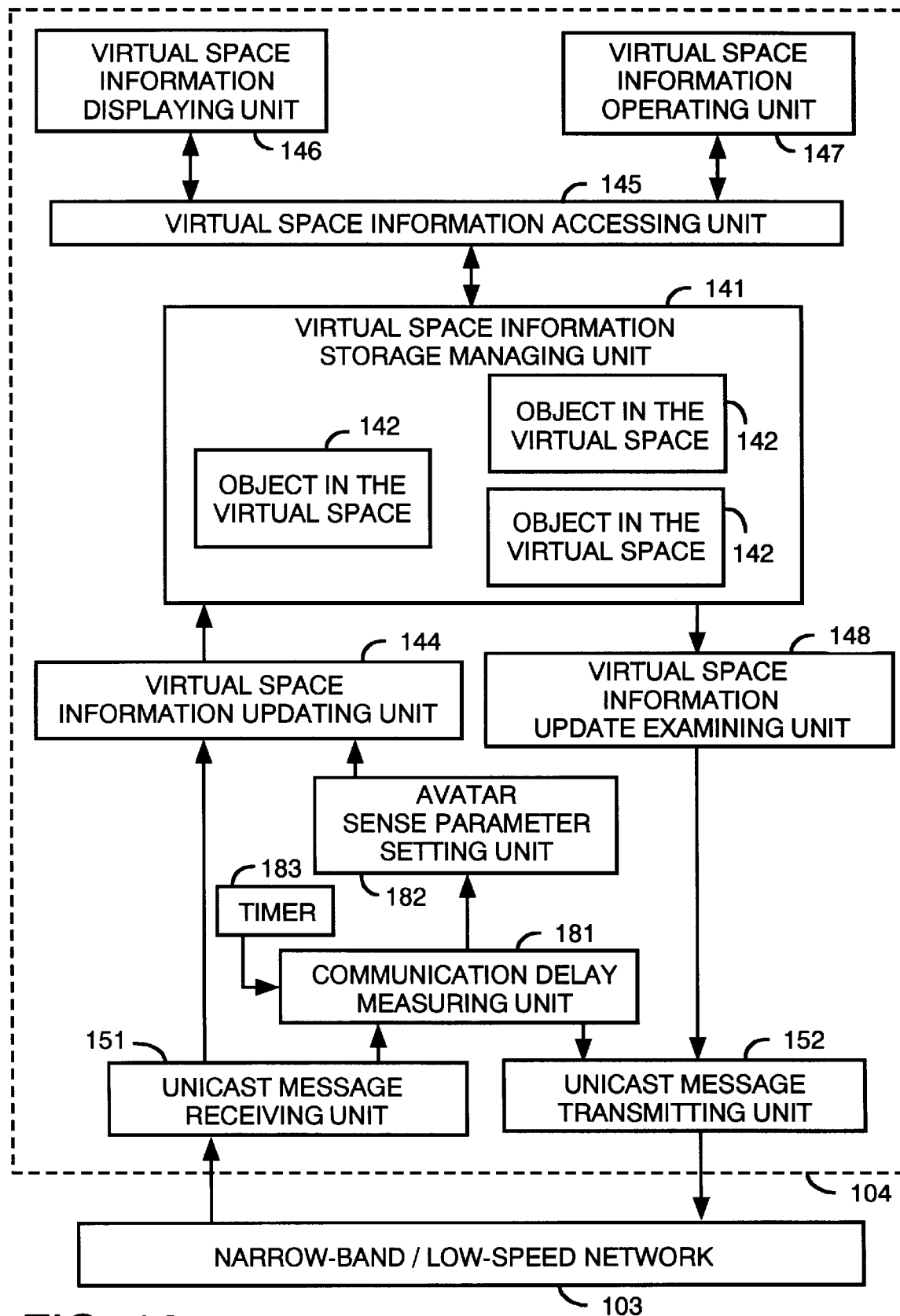
FIG. 12 illustrates a user terminal device which is connected to the narrow-band/low-speed network according to a fourth embodiment of the present invention.

FIG. 12 illustrates an arrangement of a user terminal device which is connected to the narrow-band/low-speed network of the fourth embodiment. The arrangement of FIG. 12 includes a communication delay measuring unit 181, an avatar sense parameter setting unit 182 and a timer 183.

Next, the operation is explained below. In the user terminal device 104, the communication delay measuring unit 181 periodically obtains the current time T0 using the timer 183 during communication with the virtual three dimensional space, and transmits a round trip message for measuring the communication delay to the virtual three dimensional space sharing device 105 via narrow-band/low-speed network 103, using the unicast message transmitting unit 152.

Upon receiving this communication delay measuring message, the virtual three dimensional space sharing device 105 returns back the acknowledged message added with the load average L of the current virtual three dimensional space sharing device to the message source.

The unicast message receiving unit 151 receives this acknowledged message, and delivers it to the communication delay measuring unit 181. The communication delay measuring unit 181 obtains the current time T1 from the timer 183, and sets the value (T1−T0)/2 as a communication delay D. Furthermore, the communication delay measuring unit 181 takes out the load average L of the virtual three dimensional space sharing device from the message, and delivers D and L to the avatar sense parameter setting unit 182.

The avatar sense parameter setting unit 182 sets the angle of the visual field parameter α, the visual field parameter Smax, the sound source area parameter Hmax out of the above avatar information parameters, according to the following equations.

$$\alpha = \alpha 0 \cdot (1 + (D0-D)/D0 + (L0-L)/L)$$

$$Smax = S0 \cdot (1 + (D0-D)/D0 + (L0-L)/L)$$

$$Hmax = H0 \cdot (1 + (D0-D)/D0 + (L0-L)/L)$$

where, α0, S0 and H0 are the respective default values of α, Smax and Hmax, respectively, and D0 and L0 indicate the initial values of D and L, respectively. According to these equations, the angle of the visual field α, the visual field Smax, the sound source area Hmax of the avatar of the user is narrowed under the situation in which the load of the virtual three dimensional space sharing system is high, or the communication delay from the virtual three dimensional space sharing device is large.

It should be noted that, in this example, the values of α, Smax and Hmax are adjusted according to the equations above, but it is also possible to control these values using only D and L, or to control α, Smax and Hmax using other equations so that α, Smax and Hmax are reduced when D or L increases. In addition, it is also possible to perform similar kinds of control on Smin and Hmin.

According to the user terminal device of the fourth embodiment, it is possible to automatically control the communication traffic of the messages according to the load state of the virtual three dimensional space, or according to the communication state to/from the virtual three dimensional space. In this manner, it is possible to provide an effective virtual three dimensional space sharing device.

Embodiment 5.

A fifth embodiment of the present invention is explained below using FIG. 13. In the fifth embodiment, when the voice messages are transmitted from many user terminal devices, communication traffic of the voice message is efficiently reduced without disturbing the users, the load of the virtual three dimensional space sharing device is reduced, and at the same time congestion of the network is avoided.

Figure 13:
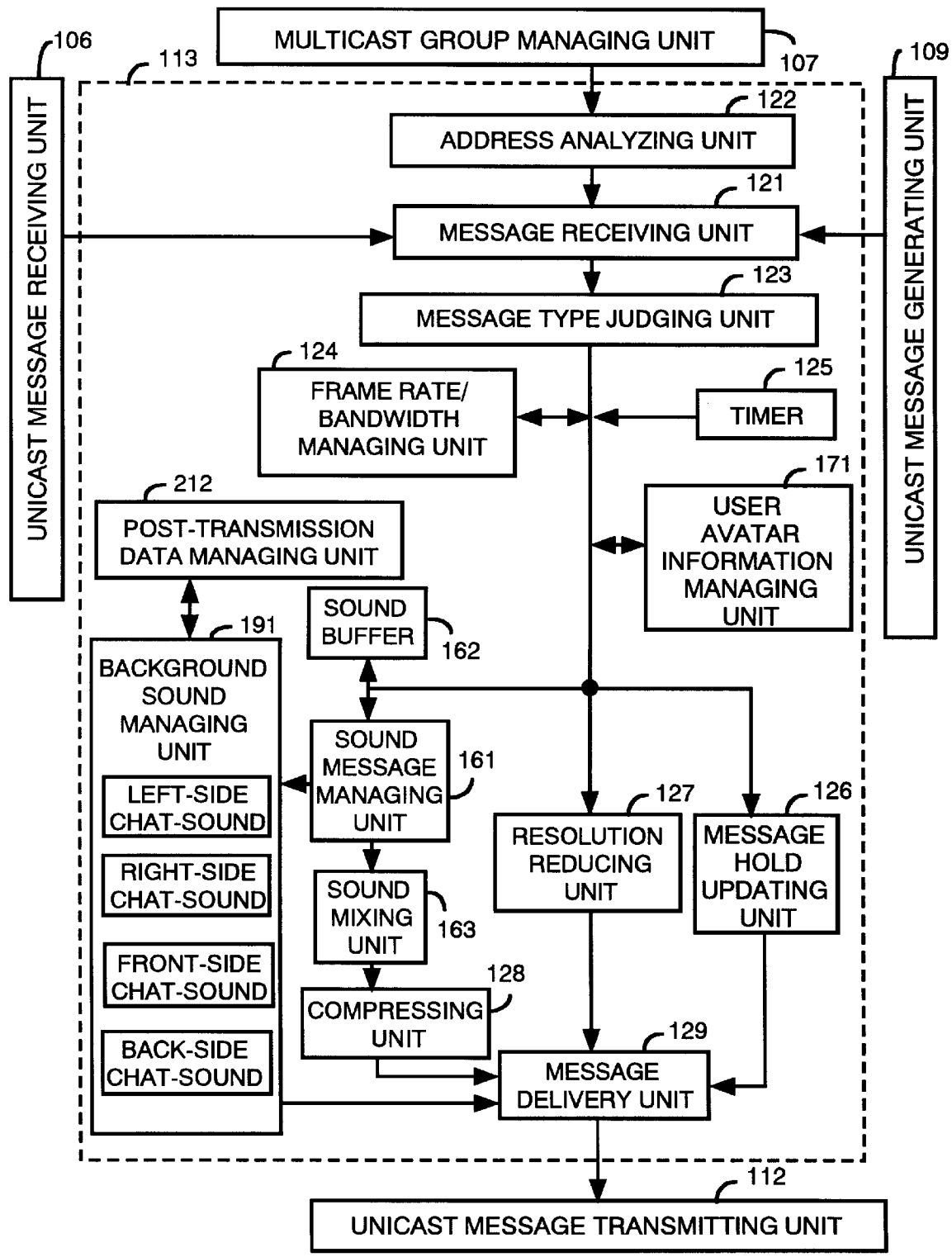
FIG. 13 illustrates a message thinning/re-assembling unit according to a fifth embodiment of the present invention.

FIG. 13 illustrates a message thinning/re-assembling unit of the virtual three dimensional space sharing device according to the fifth embodiment, and includes a background sound managing unit 191. The background sound managing unit 191 stores, in a compressed form, the chat-sounds including the left side chat-sound, right side chat-sound, front side chat-sound and back side-chat sound, which pre-record the talking voices of a plurality of people located at the left side, right side, in front of, and at the back of the user, respectively.

The message thinning/re-assembling unit of the fifth embodiment operates in the same way for the data of category A and category B as in the third embodiment. The message thinning/re-assembling unit 113 operates as follows for the data of category C. First, upon receiving messages regarding a plurality of sound objects, if the received messages are the user's voice messages, the message thinning/re-assembling unit 113 takes out the coordinates of the sound source and the sound volume from the respective messages. The coordinate indicating the position of the sound source is indicated as Ps [i], and the sound volume is indicated as V [i] for the i-th message, respectively. The background sound managing unit obtains vector Q [i] which directs from P to Ps [i] for the coordinate P of the user who receives these voice messages. Only messages whose magnitude is equal or more than Hmin and equal or less than Hmax, Q [i] are summed with the weight of V [i] to obtain a summed vector. If the direction of this summed vector is within the area of 90 degrees toward the front, in relation to the direction of the vector F, it is assumed that the chat-sound is the front chat-sound. If the direction of the summed vector is within the area of 90 degrees toward the back in relation to the direction of the vector F, it is assumed that the chat-sound is the back chat-sound. If the direction is within the area of 90 degrees in the right, it is assumed that the chat-sound is the right chat-sound, and if the direction is within the area of 90 degrees in the left, it is assumed that the chat-sound is the left chat-sound.

If the direction of the summed vector is just at 90 degrees either in the front, or at the back, either the right side chat-sound or the left side chat-sound is chosen according to the nearest summed vector. This data is assembled into a unicast message toward the destination user terminal device, and is delivered to the unicast message transmitting unit 112 via the message delivery unit 129.

According to the fifth embodiment, it is not necessary to perform the processes in the sound mixing unit 163 and compressing unit 128 each time a plurality of voice messages whose sound sources are within the area between Hmin and Hmax is received. Thus, the processing speed of the message thinning/re-assembling unit can be improved, and at the same time the number of voice messages can be reduced.

Embodiment 6.

Figure 14:
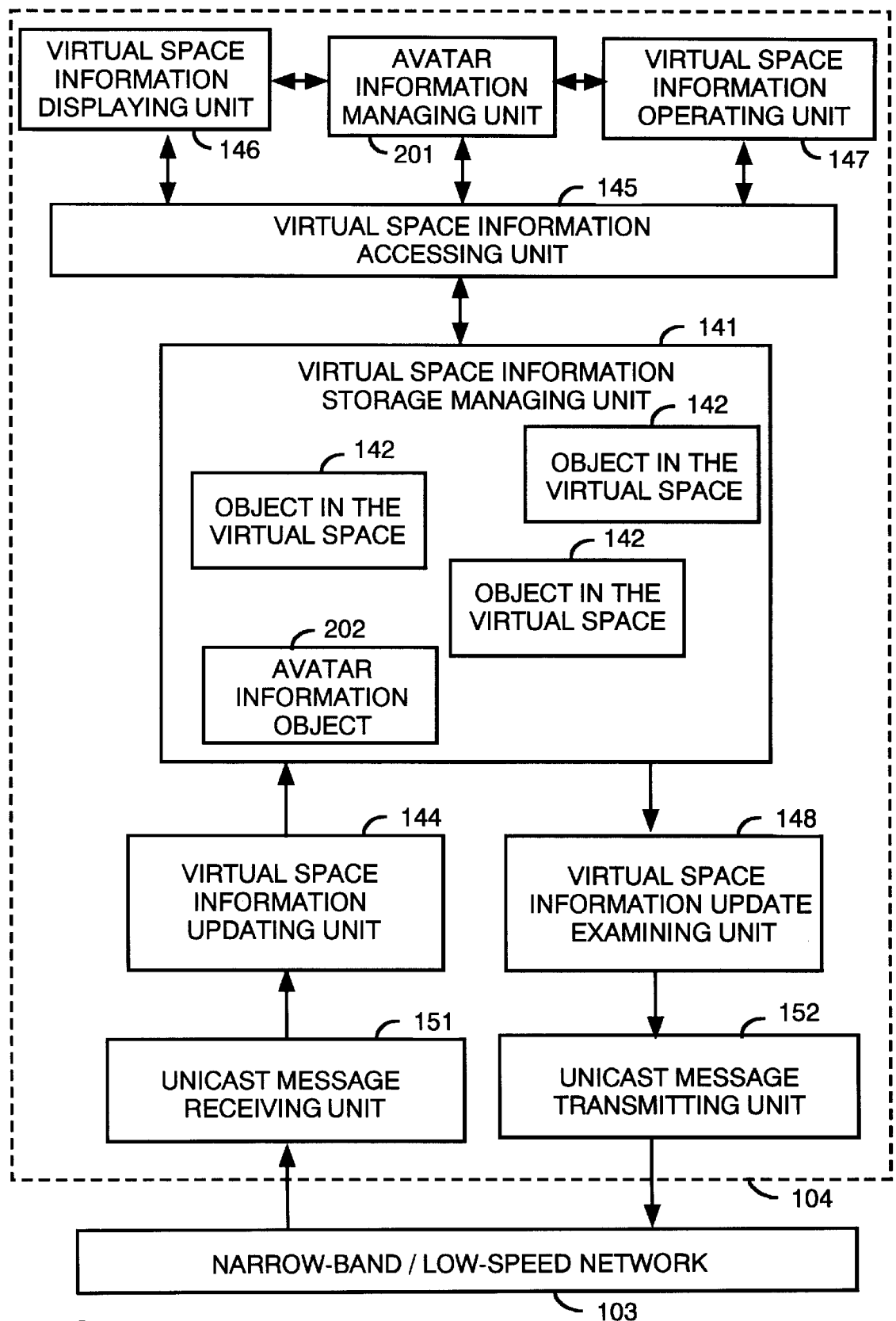
FIG. 14 illustrates a user terminal device according to a sixth embodiment of the present invention.

A sixth embodiment is explained below using FIGS. 14 and 15. The present embodiment relates to priority control of the messages which the user communicates indirectly. FIG. 14 illustrates a user terminal device according to the sixth embodiment, and includes an avatar information managing unit 201 and a avatar information object 202.

The avatar information managing unit 201 generates information regarding the avatar of the user as explained in the third embodiment when the user participates in the virtual three dimensional space, and generates the avatar information object 202 in the virtual space information storage managing unit 141 as one kind of object in the virtual three dimensional space, via the virtual space information accessing unit 145.

The virtual space information displaying unit 146 displays this avatar information in the form illustrated in FIG. 10 on the monitor of the user terminal device. The user dynamically changes the sense parameters of the avatar displayed on the monitor using the virtual space information operating unit 147. The avatar information managing unit 201 carries out the correction of the display using the virtual space information operating unit 147 and the virtual space information displaying unit 146 based on the changing demands.

The avatar information managing unit 201 obtains a ratio of the object relating to the detail sound in the current virtual three dimension space, and the object relating to graphic or image whose state is changed in the virtual three dimension space via the virtual space information accessing unit 145. For example, if the ratio of the object relating to the sound and the object relating to the image between the sense parameters of the avatar is R, a limitation requirement is given as follows.

$$R = \alpha (Smax - Smin)/(Hmax - Hmin)$$

This requirement is not necessarily limited to the above equation, but may be any equation which reflects the ratio between the sound information and the video information in the virtual space. The sense parameters by the user are limited by the avatar information managing unit 201 as in the above equation, and the sense parameters control the balance of the receiving information regarding the auditory sense and the visual sense.

The avatar information managing unit 201 updates the content of the avatar information object 202 in the virtual space information storage managing unit 141 via the virtual space information accessing unit 145. The virtual space information change examining unit 148 detects this update, and the unicast message transmission unit 152 transmits this updated information to the virtual three dimensional space sharing device 105 via the narrow-band/low-speed network 103.

Figure 15:
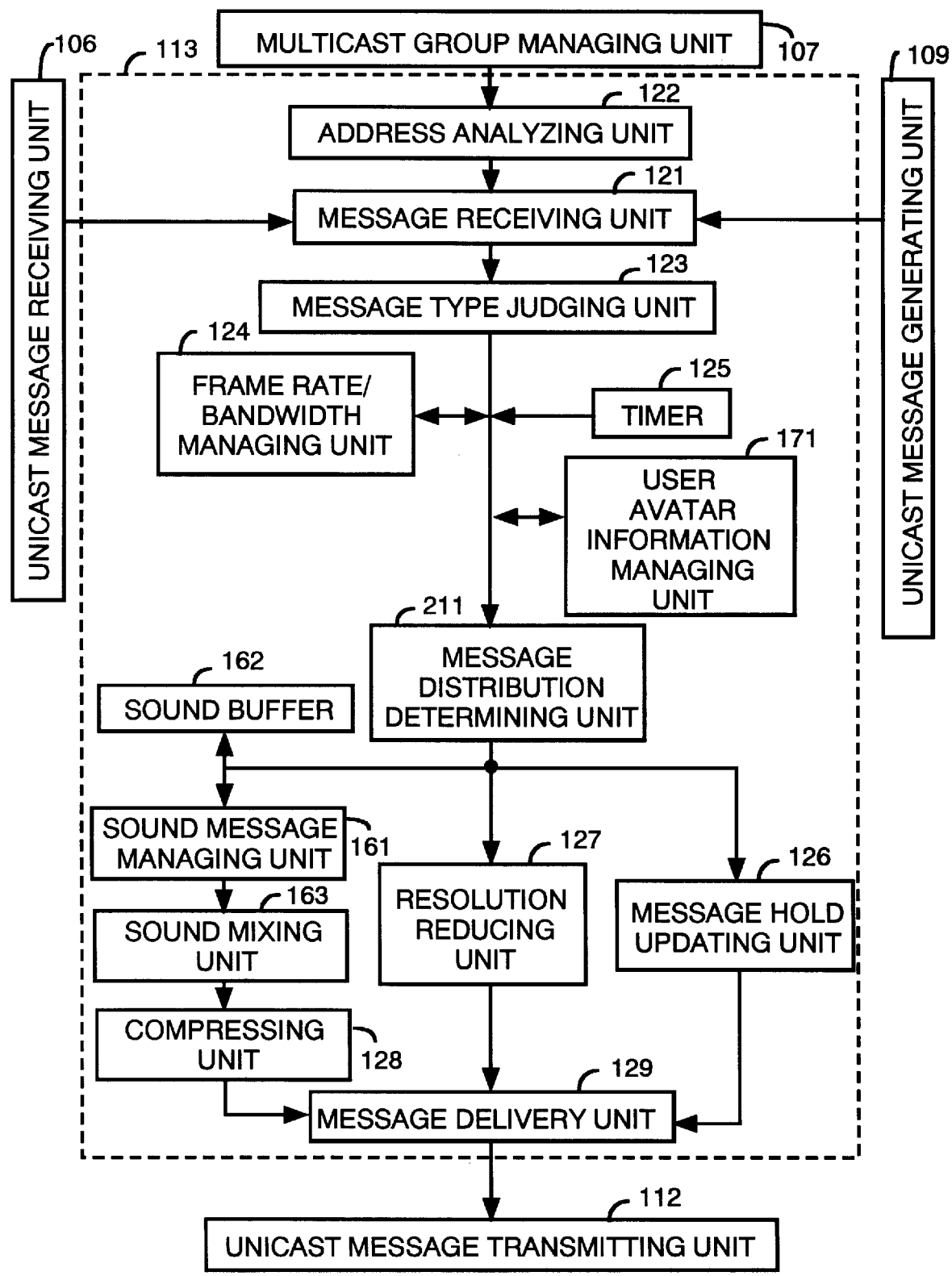
FIG. 15 illustrates a message thinning/re-assembling unit according to the sixth embodiment of the present invention.

FIG. 15 illustrates a message thinning/re-assembling unit 113 according to the present embodiment. The arrangement of FIG. 15 includes a message distribution determining unit 211. Upon receiving the message regarding the above avatar information object, the message thinning/re-assembling unit 113 stores the content into the user avatar information managing unit 171. In processing the messages from the other user terminal devices, the message distribution determining unit 211 proportionally distributes the bandwidth, which is obtained from the frame rate/bandwidth managing unit 124 transmitted to the destination terminal device, to the messages of category B and category C, using the sense parameter obtained from the user avatar information managing unit 171, according to the above limitation equation $R = \alpha \cdot (Smax - Smin)/(Hmax - Hmin)$.

Based on this proportionally distributed bandwidth, the processes are performed for the messages of category B and category C in the same manner as that in the second embodiment.

According to the above, it is possible for the user to assign the preferred priority distribution regarding the type and quality of the information, and to obtain the closer and desired information in the virtual three dimensional space.

Embodiment 7.

Next, a seventh embodiment of the present invention is explained below using FIGS. 16 and 17. In the seventh embodiment, the efficiency of message reduction method of the fifth embodiment is improved.

Figure 16:
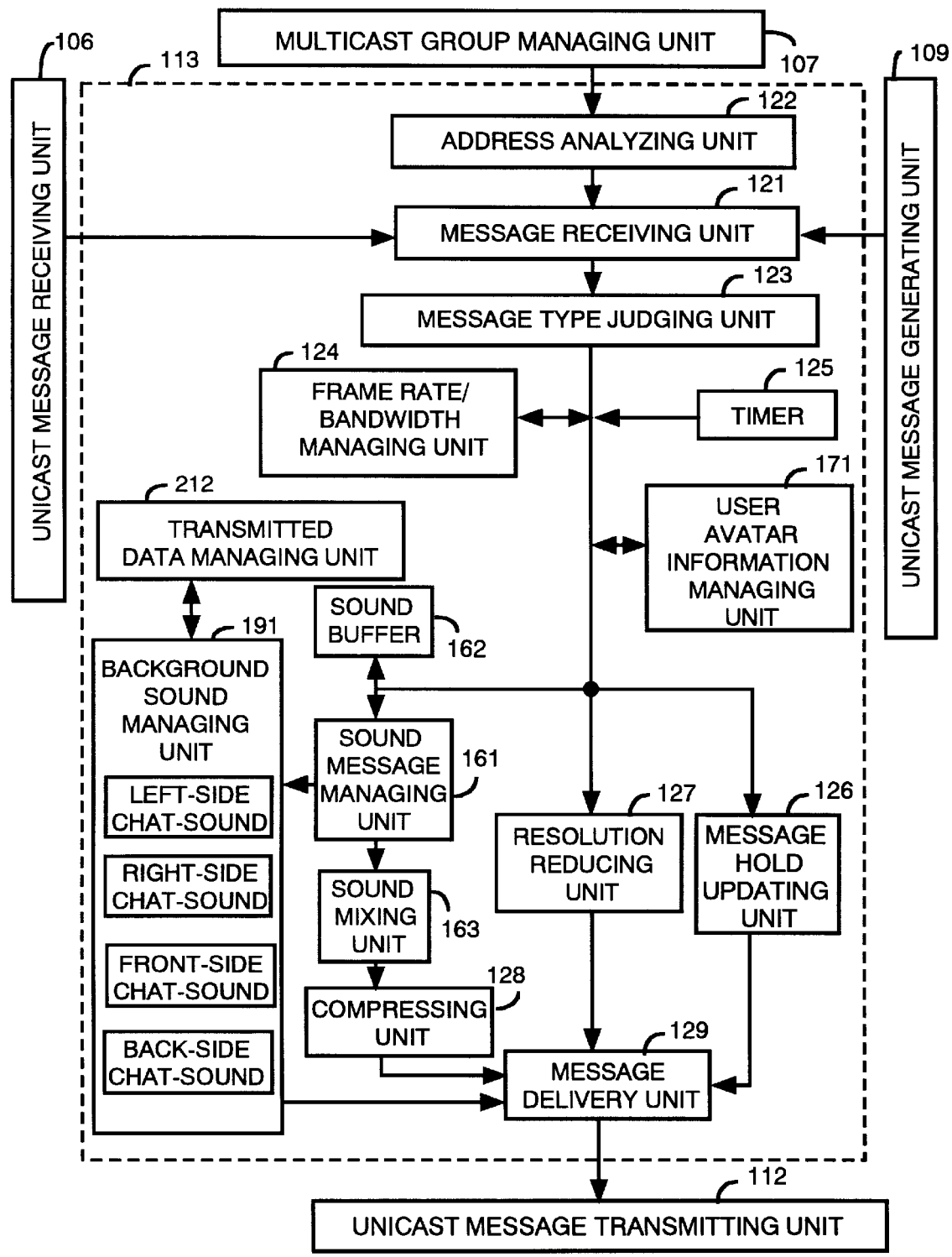
FIG. 16 illustrates a message thinning/re-assembling unit according to a seventh embodiment of the present invention.

FIG. 16 illustrates a message thinning/re-assembling unit according to the seventh embodiment, and includes a transmitted data managing unit 212. As described in the fifth embodiment, a part of the voice message is replaced by left side chat-sound, right side chat-sound, front side chat-sound and back side chat-sound to transmit a plurality of voice messages as one background sound message. At this time, the transmitted data managing unit 212 manages either of the destination address or the type of the transmitted background sound (i.e., one of the left side chat-sound, right side chat-sound, front side chat-sound and back side chat-sound) as a list.

When the combination of the address and the background sound which already exists in the list is transmitted later, a reference message containing only the name of the background sound can be transmitted instead of the actual data.

Figure 17:
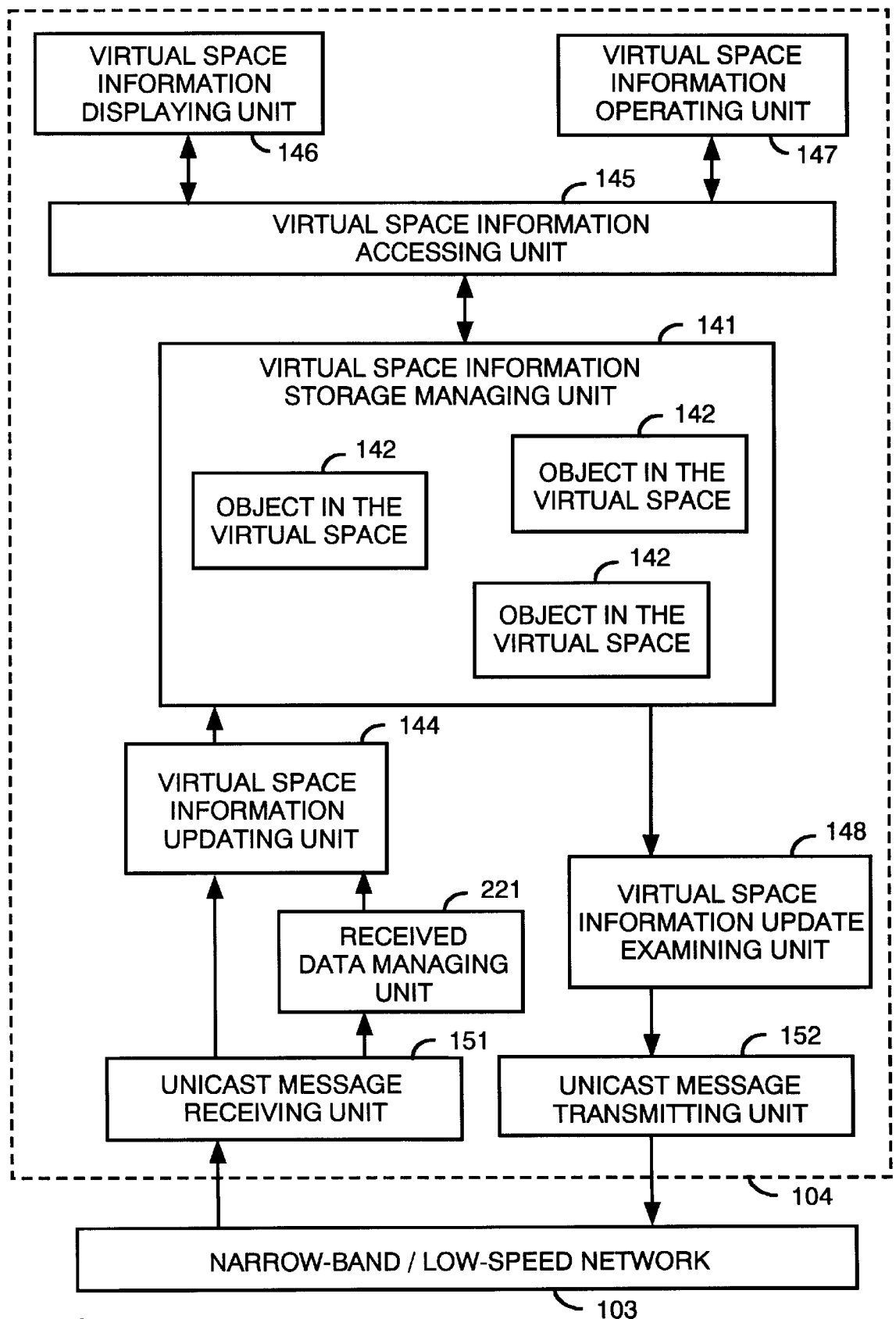
FIG. 17 illustrates a user terminal device according to the seventh embodiment of the present invention.

FIG. 17 illustrates a user terminal device 104 which is connected to the narrow-band/low-speed network, and includes a received data managing unit 221. The received data managing unit 221 stores the background sound messages, one by one, which are received for each type of the background sound by the unicast message receiving portion 151. Then, upon receiving the above referenced message, the unicast message receiving unit 151 does not deliver the reference message to the virtual space information changing unit 144, but delivers it to the received data managing unit 221. The received data managing unit 221 delivers a copy of the message, whose corresponding background sound is stored as data, to the virtual space information updating unit 144.

According to the seventh embodiment, an identical background sound of a message is stored in the unicast message receiving unit 151 and is transmitted only once. For the second time and thereafter, only the small message for referring the name of the data is transmitted to the user terminal device. Thus, it is possible to reduce the size of the message, and also to reduce the message communication traffic of the network.

Embodiment 8.

Figure 18:
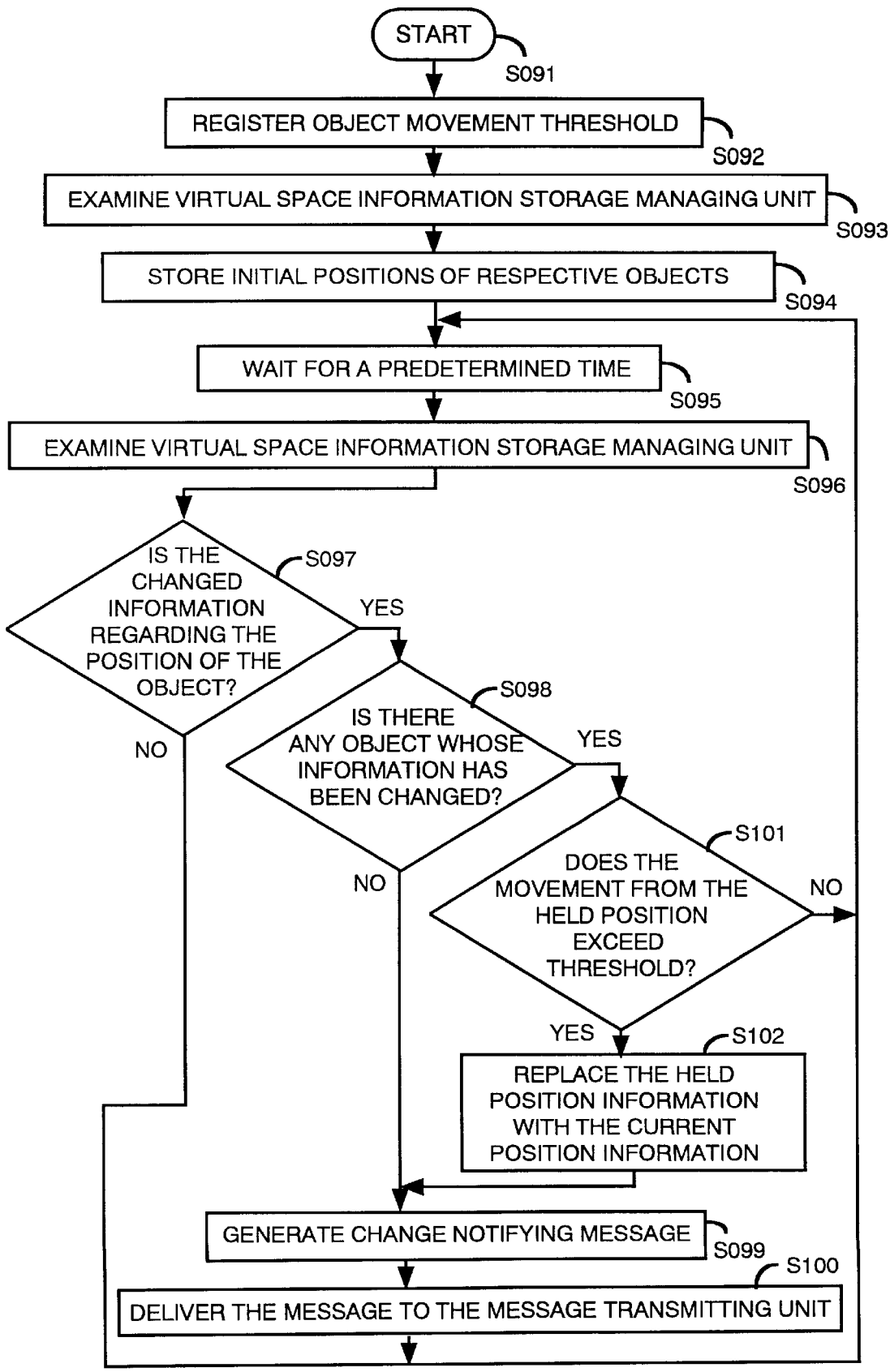
FIG. 18 is a flowchart illustrating an operation of a virtual space information update examining unit according to an eighth embodiment of the present invention.
Figure 19:
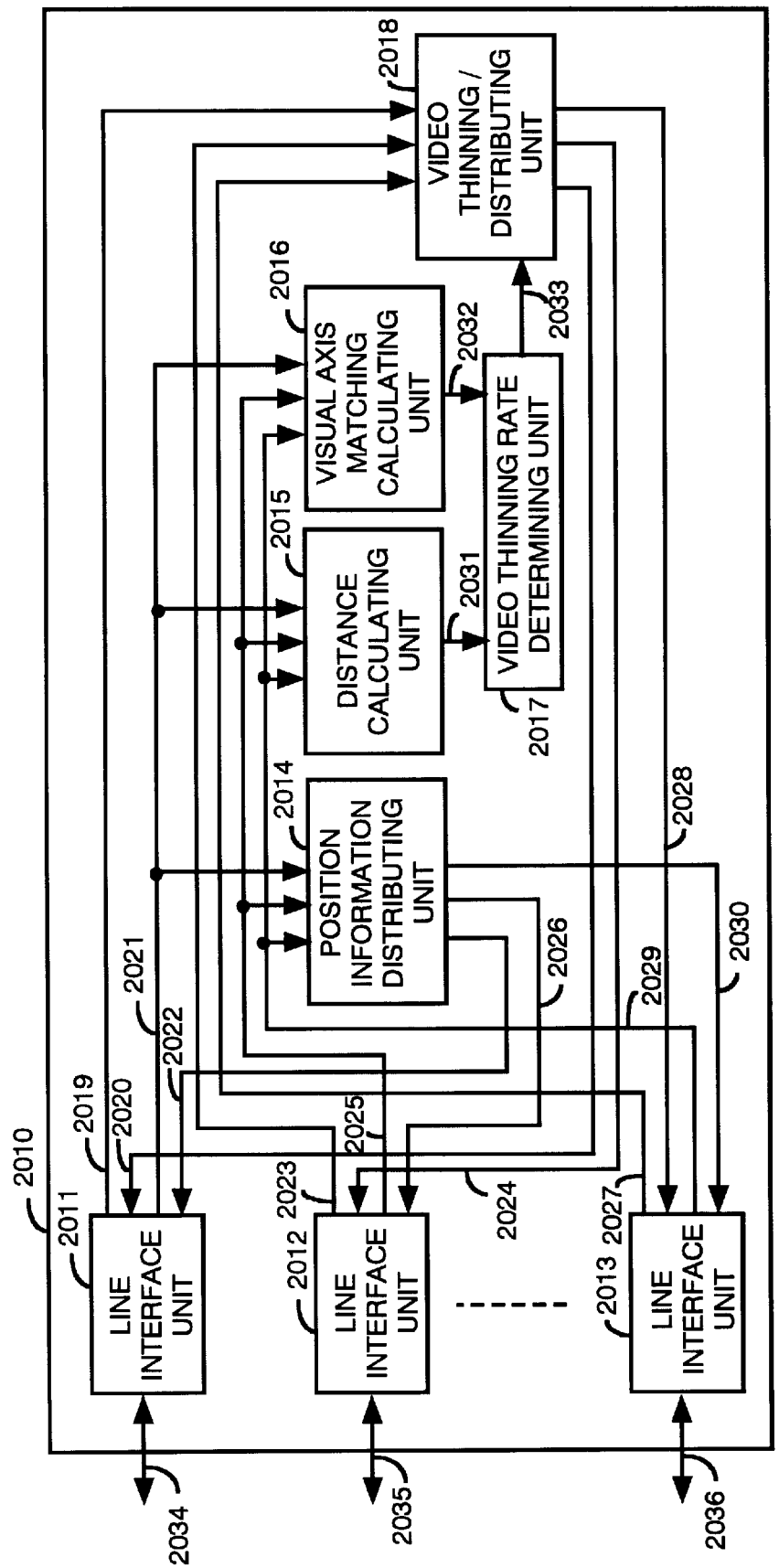
FIG. 19 illustrates a conventional virtual three dimensional space sharing device.
Figure 20:
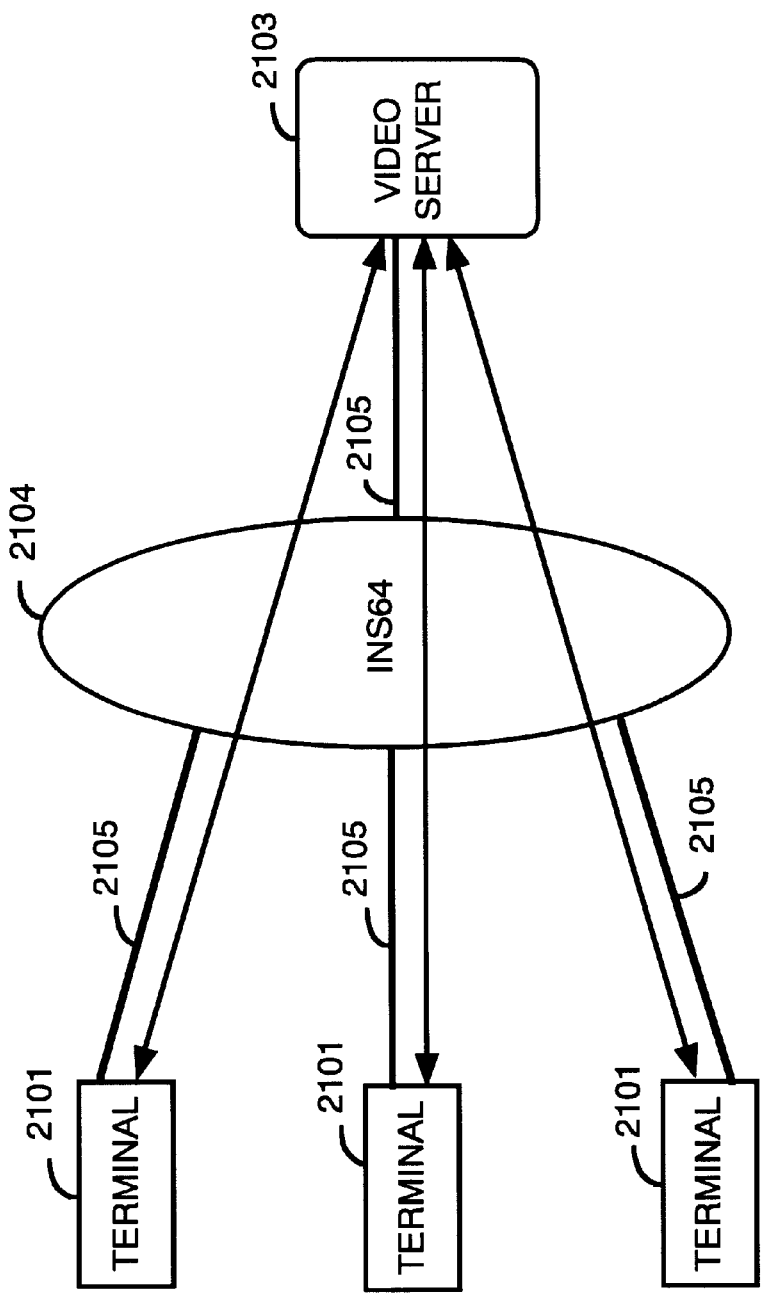
FIG. 20 illustrates the network connection of the conventional virtual three dimensional space sharing device.

Next, an eighth embodiment of the present invention is explained below using FIG. 18. The eighth embodiment relates to the reduction of messages transmitted from the user terminal device. FIG. 18 is a flowchart illustrating the operation of the virtual space information update examining unit 148 according to the eighth embodiment. After starting the operation (step S091), the virtual space information update examining unit 148 obtains the threshold of the object movement amount on the user terminal device from an application program or the user, and registers the threshold (step S092).

Then, the virtual space information update examining unit 148 examines the inside of the virtual space information storage managing unit 141 (step S093), and the initial positions of the respective objects 142 in the virtual space (step S094). The virtual space information update examining unit 148 waits for a predetermined time (step S095), examines the inside of the virtual space information storage managing unit 141 again (step S096), and observe if there are any objects whose information has been changed (step S097). If there are no changes, the process returns to the step S095.

If there are some changes, it is examined whether the changed information is the position of the objects (step S098). If it is not the position information of the objects, a change notifying message is immediately generated (step S099). This message is transmitted to the message transmitting unit (step S099), and the process returns to the step S095.

The message which is generated here is a unicast message for the user terminal devices connected to the narrow-band/low-speed network, and a multicast message for the devices connected to the wide-band/high-speed network. The message transmitting unit here is a unicast message transmitting unit 152 for the user terminal devices connected to the narrow-band/low-speed network, and a multicast message transmitting unit 149 for the devices connected to the wide-band/high-speed network.

When the changed information is determined to be object position information in the step S098, the virtual space information update examining unit 148 examines whether the amount of the movement of the objects from the position in which those objects had been held prior to the movement exceeds the threshold (step S101). If the amount of the movement exceeds the threshold, the position information of the held objects are replaced by the current position information (step S102), and the process moves to the above step S099 and S100, and returns to the step S095. If the amount of the movement does not exceed the threshold in the step S101, the process returns to the step S095.

In the eighth embodiment, as the messages are sent from the respective user terminal devices in the manner explained above, it is possible not to transmit messages relating to slight movement of the objects, which other users would hardly notice. Thus, it is possible to reduce unnecessary network communication traffic.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A virtual three dimensional space sharing system operating in a wide-area network environment having both a wide-band/high-speed network provided with at least one user terminal device and a narrow-band/low-speed network provided with at least one user terminal device, for sharing a virtual three dimensional space including at least one type of media among the at least one user terminal device, the system comprising:

a multicast message transmitting unit and a multicast message receiving unit for performing multicast communication with the wide-band/high-speed network;

a unicast message transmitting unit and a unicast message receiving unit for performing unicast communication with the narrow-band/low-speed network;

a multicast group managing unit, a unicast message generating unit and a multicast message generating unit, for coordinating the multicast communication and the unicast communication; and a message thinning/re-assembling unit for reducing the communication traffic in the narrow-band/low-speed network.

2. The virtual three dimensional space sharing system of claim 1, wherein said message thinning/re-assembling unit mixes and compresses at least one sound message transmitted from the at least one user terminal device into one message.

3. The virtual three dimensional space sharing system of claim 2, wherein said message thinning/re-assembling unit reduces and reassembles messages based on a visual field range and a visual field angle parameter of a video object placed in the virtual three dimensional space, or based on an auditory parameter defined by a distance from a sound object.

4. The virtual three dimensional space sharing system of claim 3, wherein the at least one user terminal device to the narrow-band/low-speed network comprises a communication delay measuring unit for measuring a delay time to or from the virtual three dimensional space sharing system, wherein said communication delay measuring unit sets and changes an auditory parameter defined by the visual field range and the visual field angle parameter toward the video object placed in the virtual three dimensional space or defined by the distance from the sound object, based on a communication load measurement.

5. The virtual three dimensional space sharing device of claim 3, wherein said message thinning/re-assembling unit comprises a background sound managing unit for managing a recorded background for each direction, wherein said background sound managing unit calculates the direction of background sounds based on a position and a sound volume of the sound object, and transfers the at least one corresponding background sound to the at least one terminal device.

6. The virtual three dimensional space sharing system of claim 5, wherein said message thinning/re-assembling unit comprises a transmitted data managing unit for managing the background sounds which have been already transmitted, said message thinning/re-assembling unit transmitting at least one identifier, stored in the transmitted data managing unit which correspond to the background sounds, to the same at least one user terminal, if the background sounds have been already transmitted; and the at least one user terminal comprises a received data managing unit for storing received background sounds, said message thinning/re-assembling unit extracting and processing corresponding background data from the received data managing unit if the at least one identifier corresponding to the background sounds are received.

7. The virtual dimensional space sharing system of claim 3, further comprising a message distribution determining unit for controlling a sense balance of an auditory sense and a visual sense of the sound object and the video object, which includes an updated virtual space on the at least one user terminal device, and wherein said message distribution determining unit distributes at least one message received from the at least one user terminal device to the sound object and the video object based on a sense parameter.

8. The virtual three dimensional space sharing system of claim 1, wherein the at least one user terminal device includes a virtual space information update examining unit, wherein said virtual space information update examining unit transmits a message indicating that a state of a video object exceeds a predetermined threshold when the state of the video object including the virtual three dimensional space exceeds the predetermined threshold.

9. A method for sharing a virtual three dimensional space operating in a wide-area network environment having a wide-band/high-speed network operatively connected with at least one user terminal device and a narrow-band/low-speed network operatively connected with at least one user terminal device, comprising the steps of:

receiving at least one unicast message from the at least one user terminal device operatively connected to the narrow-band/low-speed network;

converting the at least one received unicast message into at least one multicast message, the at least one received unicast message including at least one multicast destination address of the at least one user terminal device operatively connected to the wide-band/high-speed network; and transmitting the at least one multicast message to the at least one multicast destination address of the at least one user terminal device operatively connected to the wide-band/high-speed network.

10. The method for sharing a virtual three dimensional space of claim 9, further comprising the steps of:

determining whether the at least one user terminal device operatively connected to the narrow-band/low-speed network corresponds to a multicast group of which the at least one user terminal device operatively connected to the wide-band/high-speed network located at the at least one multicast destination address of the at least one multicast message belongs;

thinning the at least one multicast message;

converting the at least one multicast message back into the received unicast message; and transmitting the at least one multicast message to the at least one user terminal device operatively connected to the narrow-band/low-speed network which is found to correspond to the multicast group of which the at least one user terminal device operatively connected to the wide-band/high-speed network located at the at least one multicast destination address of the at least one multicast message belongs.

11. The method for sharing a virtual three dimensional space of claim 10, wherein the thinning step is based on a frame rate and a network bandwidth.

12. A method for sharing a virtual three dimensional space operating in a wide-area network environment having a wide-band/high-speed network operatively connected with at least one user terminal device and a narrow-band/low-speed network operatively connected with at least one user terminal device, comprising the steps of:

receiving at least one message from the at least one user terminal device operatively connected to the wide-band/high-speed network;

extracting a multicast group, of which the at least one user terminal device operatively connected to the wide-band/high-speed network belongs, from the at least one received message;

determining whether the at least one user terminal device operatively connected to the narrow-band/low-speed network corresponds to the extracted multicast group;

generating at least one first unicast message, for each address of the at least one user terminal device determined to correspond to the extracted multicast group, from the at least one received message;

thinning the at least one first unicast message;

reassembling the at least one first unicast message into at least one second unicast message addressed to at least one corresponding user terminal device operatively connected to the narrow-band/low-speed network; and transmitting the at least one second unicast message to the at least one corresponding user terminal device operatively connected to the narrow-band/low-speed network.

13. The method for sharing a virtual three dimensional space of claim 12, wherein the thinning step is based on a frame rate and a network bandwidth.

14. A method for initializing a virtual three dimensional space sharing device operating in a wide-area network environment having a wide-band/high-speed network provided with at least one user terminal device and a narrow-band/low-speed network provided with at least one user terminal device, comprising the steps of:

receiving at least one participation demand message;

determining whether the at least one participation demand message was originated by the at least one user terminal device in communication with the wide-band/high-speed network or the at least one user terminal device in communication with the narrow-band/low-speed network;

registering at least one attribute of the at least one participation demand message with a multicast group managing unit and a message thinning/reassembling unit, and generating at least one multicast message, where the at least one participation demand message was originated by the at least one user terminal device in communication with the narrow-band/low-speed network, or registering a multicast group, to which the at least one participation demand message corresponds, with the multicast group managing unit, and generating at least one unicast message, where the at least one participation demand message was originated by the at least one user terminal device in communication with the wide-band/high-speed network; and transmitting the at least one multicast message to the wide-band/high-speed network or the at least one unicast message to the narrow-band/low-speed network.

15. The method for initializing the virtual three dimensional space sharing device of claim 14, comprising the additional steps of:

assigning a multicast group to a corresponding name of the virtual three dimensional space, in which the at least one user terminal device will participate in, where the at least one participation demand message was originated by the at least one user terminal device in communication with the narrow-band/low-speed network; and registering the multicast group and a corresponding address of the at least one user terminal device, which will participate in the three dimensional space, in the multicast group managing unit.

16. The method for initializing the virtual three dimensional space sharing device of claim 15, wherein at least one of an information display frame rate, a number of colors and resolution of the at least one user terminal device and a bandwidth of a using network are extracted from the at least one participation demand message and registered with the message thinning/reassembling unit.

17. The method for initializing the virtual three dimensional space sharing device of claim 14, wherein the thinning/reassembling unit reassembles messages addressed to an identical user terminal device into an individual message and transmits the individual message to the narrow-band/low-speed network, where the at least one participation demand message was originated by the at least one user terminal device in communication with the wide-band/high-speed network.

18. A message thinning/reassembling unit for use in a shared virtual three dimensional space system operating in a wide-area network environment having a wide-band/high-speed network operatively connected with at least one user terminal device and a narrow-band/low-speed network operatively connected with at least one user terminal device, comprising:

a message receiving unit which receives at least one unicast message;

a timer providing a current time at which the at least one unicast message is received, wherein a message hold-updating unit stores the current time;

an address analyzing unit looking up a destination address of the at least one received unicast message;

a frame rate/bandwidth managing unit registering the destination address of the at least one received unicast message;

a message type determining unit determining a type of data contained in the at least one received unicast message;

a resolution reducing unit reducing the at least one received unicast message by thinning a resolution of image data contained in the at least one received unicast message and reassembling the reduced at least one received unicast message; and a message delivery unit delivering the at least one received unicast message according to the type of data contained in the at least one received unicast message as determined by said message type determining unit.

* * * * *